(12) United States Patent
Baldwin et al.

(10) Patent No.: US 10,831,316 B2
(45) Date of Patent: Nov. 10, 2020

(54) SURFACE INTERFACE

(71) Applicant: AT&T Intellectual Property I, L.P., Atlanta, GA (US)

(72) Inventors: Christopher Baldwin, Algonquin, IL (US); Brian Amento, Port Murray, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 16/046,245

(22) Filed: Jul. 26, 2018

(65) Prior Publication Data

US 2020/0033995 A1 Jan. 30, 2020

(51) Int. Cl.
*G06F 3/043* (2006.01)
*G06F 3/01* (2006.01)
*G06F 3/0354* (2013.01)
*G06F 3/041* (2006.01)

(52) U.S. Cl.
CPC ............ *G06F 3/0433* (2013.01); *G06F 3/011* (2013.01); *G06F 3/03545* (2013.01); *G06F 3/0416* (2013.01)

(58) Field of Classification Search
CPC .... G06F 3/0433; G06F 3/011; G06F 3/03545; G06F 3/0416
USPC .................................................. 345/173–177
See application file for complete search history.

(56) References Cited

U.S. PATENT DOCUMENTS

| 3,629,521 A | 12/1971 | Puharich et al. |
| 4,048,986 A | 9/1977 | Ott |
| 4,340,778 A | 7/1982 | Cowans et al. |
| 4,421,119 A | 12/1983 | Pratt |
| 4,720,607 A | 1/1988 | de Moncuit |
| 4,754,763 A | 7/1988 | Doemland |
| 4,799,498 A | 1/1989 | Collier |
| 4,988,981 A | 1/1991 | Zimmerman et al. |

(Continued)

FOREIGN PATENT DOCUMENTS

| AU | 2003257031 | 2/2004 |
| AU | 2007200415 | 8/2007 |

(Continued)

OTHER PUBLICATIONS

U.S. Office Action dated Jan. 9, 2019 in U.S. Appl. No. 14/083,094.

(Continued)

*Primary Examiner* — Kwin Xie
(74) *Attorney, Agent, or Firm* — Hartman & Citrin LLC

(57) ABSTRACT

Concepts and technologies are disclosed herein for a surface interface. According to one aspect of the concepts and technologies disclosed herein, a system can include a plurality of surface transducers, a user transducer, and a user device. The plurality of surface transducers are in contact with a surface that is to be used as an input interface for a user. The user transducer is in contact with the user. The user device can include a processor and memory. The memory can stores instructions that, when executed by the processor, cause the processor to perform operations. In particular, the processor can analyze a received portion of a signal to determine a relative location of a part of a body of the user on the surface, and can perform a function responsive to the relative location of the part of the body of the user on the surface.

19 Claims, 16 Drawing Sheets

(56) References Cited

U.S. PATENT DOCUMENTS

| | | |
|---|---|---|
| 5,024,239 A | 6/1991 | Rosenstein |
| 5,073,950 A | 12/1991 | Colbert et al. |
| 5,125,313 A | 6/1992 | Hiyoshi et al. |
| 5,319,747 A | 6/1994 | Gerrissen et al. |
| 5,327,506 A | 7/1994 | Stites, III |
| 5,368,044 A | 11/1994 | Cain et al. |
| 5,495,241 A | 2/1996 | Doing et al. |
| 5,615,681 A | 4/1997 | Ohtomo |
| 5,664,227 A | 9/1997 | Mauldin et al. |
| 5,720,290 A | 2/1998 | Buhler |
| 5,749,363 A | 5/1998 | Ishii |
| 5,750,941 A | 5/1998 | Ishikawa et al. |
| 5,766,208 A | 6/1998 | McEwan |
| 5,810,731 A | 9/1998 | Sarvazyan et al. |
| 5,813,406 A | 9/1998 | Kramer et al. |
| 5,836,876 A | 11/1998 | Dimarogonas |
| 6,024,711 A | 2/2000 | Lentle |
| 6,115,482 A | 9/2000 | Sears et al. |
| 6,135,951 A | 10/2000 | Richardson et al. |
| 6,151,208 A | 11/2000 | Bartlett |
| 6,154,199 A | 11/2000 | Butler |
| 6,213,934 B1 | 4/2001 | Bianco |
| 6,234,975 B1 | 5/2001 | McLeod et al. |
| 6,335,723 B1 | 1/2002 | Wood et al. |
| 6,336,045 B1 | 1/2002 | Brooks |
| 6,380,923 B1 | 4/2002 | Fukumoto |
| 6,396,930 B1 | 5/2002 | Vaudrey et al. |
| 6,409,684 B1 | 6/2002 | Wilk |
| 6,414,673 B1 | 7/2002 | Wood et al. |
| 6,507,662 B1 | 1/2003 | Brooks |
| 6,515,669 B1 | 2/2003 | Mohri |
| 6,580,356 B1 | 6/2003 | Alt et al. |
| 6,589,287 B2 | 7/2003 | Lundborg |
| 6,631,197 B1 | 10/2003 | Taenzer |
| 6,754,472 B1 | 6/2004 | Williams et al. |
| 6,783,501 B2 | 8/2004 | Takahashi et al. |
| 6,798,403 B2 | 9/2004 | Kitada et al. |
| 6,844,660 B2 | 1/2005 | Scott |
| 6,898,299 B1 | 5/2005 | Brooks |
| 6,912,287 B1 | 6/2005 | Fukumoto et al. |
| 7,010,139 B1 | 3/2006 | Smeehuyzen |
| 7,123,752 B2 | 10/2006 | Kato et al. |
| 7,148,879 B2 | 12/2006 | Amento et al. |
| 7,198,607 B2 | 4/2007 | Jamsen |
| 7,206,423 B1 | 4/2007 | Feng et al. |
| 7,232,416 B2 | 6/2007 | Czernicki |
| 7,370,208 B2 | 5/2008 | Levin et al. |
| 7,405,725 B2 | 7/2008 | Mohri et al. |
| 7,536,557 B2 | 5/2009 | Murakami et al. |
| 7,539,533 B2 | 5/2009 | Tran |
| 7,615,018 B2 | 11/2009 | Nelson et al. |
| 7,625,315 B2 | 12/2009 | Hickman |
| 7,648,471 B2 | 1/2010 | Hobson |
| 7,671,351 B2 | 3/2010 | Setlak et al. |
| 7,708,697 B2 | 5/2010 | Wilkinson et al. |
| 7,760,918 B2 | 7/2010 | Bezvershenko et al. |
| 7,778,848 B1 | 8/2010 | Reeves |
| 7,796,771 B2 | 9/2010 | Calhoun et al. |
| 7,878,075 B2 | 2/2011 | Johansson et al. |
| 7,914,468 B2 | 3/2011 | Shalon et al. |
| 7,918,798 B2 | 4/2011 | Wu |
| 8,023,669 B2 | 9/2011 | Segev et al. |
| 8,023,676 B2 | 9/2011 | Abolfathi et al. |
| 8,031,046 B2 | 10/2011 | Franza et al. |
| 8,098,129 B2 | 1/2012 | Falck et al. |
| 8,196,470 B2 | 6/2012 | Gross et al. |
| 8,200,289 B2 | 6/2012 | Joo et al. |
| 8,253,693 B2 | 8/2012 | Buil et al. |
| 8,270,637 B2 | 9/2012 | Abolfathi |
| 8,270,638 B2 | 9/2012 | Abolfathi et al. |
| 8,312,660 B1 | 11/2012 | Fujisaki |
| 8,330,744 B2 | 12/2012 | Nikolovski et al. |
| 8,348,936 B2 | 1/2013 | Trembly et al. |
| 8,421,634 B2 | 4/2013 | Tan et al. |
| 8,467,742 B2 | 6/2013 | Hachisuka et al. |
| 8,482,488 B2 | 7/2013 | Jannard |
| 8,491,446 B2 | 7/2013 | Hinds et al. |
| 8,500,271 B2 | 8/2013 | Howell et al. |
| 8,521,239 B2 | 8/2013 | Hosoi et al. |
| 8,540,631 B2 | 9/2013 | Penner et al. |
| 8,542,095 B2 | 9/2013 | Kamei |
| 8,560,034 B1 | 10/2013 | Diab et al. |
| 8,594,568 B2 | 11/2013 | Falck |
| 8,750,852 B2 | 6/2014 | Forutanpour et al. |
| 8,908,894 B2 | 12/2014 | Amento |
| 8,922,427 B2 | 12/2014 | Dehnie et al. |
| 9,031,293 B2 | 5/2015 | Kalinli-Akbacak |
| 9,386,962 B2 | 7/2016 | Dahl |
| 9,396,378 B2 | 7/2016 | Holz et al. |
| 9,411,440 B2 | 8/2016 | Avanzi |
| 9,594,433 B2 | 3/2017 | Baldwin et al. |
| 9,600,079 B2 | 3/2017 | Baldwin et al. |
| 9,613,262 B2 | 4/2017 | Holz |
| 2001/0013546 A1 | 8/2001 | Ross |
| 2001/0051776 A1 | 12/2001 | Lenhardt |
| 2003/0048915 A1 | 3/2003 | Bank |
| 2003/0066882 A1 | 4/2003 | Ross |
| 2003/0125017 A1 | 7/2003 | Greene et al. |
| 2003/0133008 A1 | 7/2003 | Stephenson |
| 2004/0152440 A1 | 8/2004 | Yoda et al. |
| 2005/0207599 A1 | 9/2005 | Fukumoto et al. |
| 2005/0210269 A1 | 9/2005 | Tiberg |
| 2006/0018488 A1 | 1/2006 | Viala et al. |
| 2006/0132455 A1 | 6/2006 | Rimas-Ribikauskas et al. |
| 2006/0139339 A1 | 6/2006 | Pechman et al. |
| 2006/0149337 A1 | 7/2006 | John |
| 2007/0012507 A1 | 1/2007 | Lyon |
| 2007/0142874 A1 | 6/2007 | John |
| 2008/0064955 A1 | 3/2008 | Miyajima |
| 2008/0084859 A1 | 4/2008 | Sullivan |
| 2008/0223925 A1 | 9/2008 | Saito et al. |
| 2008/0260211 A1 | 10/2008 | Bennett et al. |
| 2009/0149722 A1 | 6/2009 | Abolfathi et al. |
| 2009/0228791 A1 | 9/2009 | Kim |
| 2009/0234262 A1 | 9/2009 | Reid, Jr. et al. |
| 2009/0287485 A1 | 11/2009 | Glebe |
| 2009/0289958 A1 | 11/2009 | Kim et al. |
| 2009/0304210 A1 | 12/2009 | Weisman |
| 2009/0309751 A1 | 12/2009 | Kano et al. |
| 2010/0016741 A1 | 1/2010 | Mix et al. |
| 2010/0066664 A1 | 3/2010 | Son et al. |
| 2010/0137107 A1 | 6/2010 | Jamsa et al. |
| 2010/0162177 A1 | 6/2010 | Eves et al. |
| 2010/0168572 A1 | 7/2010 | Sliwa et al. |
| 2010/0220078 A1 | 9/2010 | Zloter et al. |
| 2010/0283745 A1 | 11/2010 | Nikolovski et al. |
| 2010/0286571 A1 | 11/2010 | Allum et al. |
| 2010/0297944 A1 | 11/2010 | Lee |
| 2010/0315206 A1 | 12/2010 | Schenk et al. |
| 2010/0316235 A1 | 12/2010 | Park et al. |
| 2010/0328033 A1 | 12/2010 | Kamei |
| 2011/0022025 A1 | 1/2011 | Savoie et al. |
| 2011/0125063 A1 | 5/2011 | Shalon et al. |
| 2011/0134030 A1 | 6/2011 | Cho |
| 2011/0135106 A1 | 6/2011 | Yehuday et al. |
| 2011/0137649 A1 | 6/2011 | Rasmussen et al. |
| 2011/0152637 A1 | 6/2011 | Kateraas et al. |
| 2011/0155479 A1 | 6/2011 | Oda |
| 2011/0227856 A1 | 9/2011 | Corroy et al. |
| 2011/0245669 A1 | 10/2011 | Zhang |
| 2011/0255702 A1 | 10/2011 | Jensen |
| 2011/0260830 A1 | 10/2011 | Weising |
| 2011/0269601 A1 | 11/2011 | Nelson et al. |
| 2011/0276312 A1 | 11/2011 | Shalon et al. |
| 2011/0280239 A1 | 11/2011 | Tung et al. |
| 2011/0282662 A1 | 11/2011 | Aonuma et al. |
| 2012/0010478 A1 | 1/2012 | Kinnunen et al. |
| 2012/0011990 A1 | 1/2012 | Mann |
| 2012/0058859 A1 | 3/2012 | Elsom-Cook et al. |
| 2012/0065477 A1 | 3/2012 | Enomoto |
| 2012/0065506 A1 | 3/2012 | Smith |
| 2012/0143693 A1 | 6/2012 | Chung et al. |
| 2012/0202479 A1 | 8/2012 | Sugitani et al. |
| 2012/0212441 A1 | 8/2012 | Christiansson et al. |

(56) References Cited

U.S. PATENT DOCUMENTS

| | | |
|---|---|---|
| 2012/0280900 A1 | 11/2012 | Wang et al. |
| 2012/0290832 A1 | 11/2012 | Antequera Rodriguez et al. |
| 2013/0034238 A1 | 2/2013 | Abolfathi |
| 2013/0041235 A1 | 2/2013 | Rogers et al. |
| 2013/0097292 A1 | 4/2013 | Yoakum et al. |
| 2013/0119133 A1 | 5/2013 | Michael et al. |
| 2013/0120458 A1 | 5/2013 | Celebisoy et al. |
| 2013/0135223 A1 | 5/2013 | Shai |
| 2013/0170471 A1 | 7/2013 | Nix |
| 2013/0171599 A1 | 7/2013 | Bleich et al. |
| 2013/0173926 A1 | 7/2013 | Morese et al. |
| 2013/0212648 A1 | 8/2013 | Tietjen et al. |
| 2013/0215060 A1 | 8/2013 | Nakamura |
| 2013/0225915 A1 | 8/2013 | Redfield et al. |
| 2013/0225940 A1 | 8/2013 | Fujita et al. |
| 2013/0257804 A1 | 10/2013 | Vu et al. |
| 2013/0278396 A1 | 10/2013 | Kimmel |
| 2013/0288655 A1 | 10/2013 | Foruntanpour et al. |
| 2013/0346620 A1 | 12/2013 | Gizis et al. |
| 2014/0009262 A1 | 1/2014 | Robertson et al. |
| 2014/0028604 A1 | 1/2014 | Morinaga et al. |
| 2014/0035884 A1 | 2/2014 | Oh et al. |
| 2014/0097608 A1 | 4/2014 | Buzhardt et al. |
| 2014/0099991 A1 | 4/2014 | Cheng et al. |
| 2014/0107531 A1 | 4/2014 | Baldwin |
| 2014/0156854 A1 | 6/2014 | Gaetano, Jr. |
| 2014/0168093 A1 | 6/2014 | Lawrence |
| 2014/0168135 A1 | 6/2014 | Saukko et al. |
| 2014/0174174 A1 | 6/2014 | Uehara et al. |
| 2014/0188561 A1 | 7/2014 | Tenbrock et al. |
| 2014/0210791 A1 | 7/2014 | Hanauer et al. |
| 2014/0240124 A1 | 8/2014 | Bychkov |
| 2015/0084011 A1 | 3/2015 | Park et al. |
| 2015/0092962 A1 | 4/2015 | Amento et al. |
| 2015/0105159 A1 | 4/2015 | Palotas |
| 2015/0120465 A1 | 4/2015 | Baldwin et al. |
| 2015/0128094 A1 | 5/2015 | Baldwin et al. |
| 2015/0137936 A1 | 5/2015 | Baldwin et al. |
| 2015/0137960 A1 | 5/2015 | Baldwin et al. |
| 2015/0138062 A1 | 5/2015 | Baldwin et al. |
| 2015/0150116 A1 | 5/2015 | Baldwin et al. |
| 2015/0199950 A1 | 7/2015 | Heiman et al. |
| 2015/0297140 A1 | 10/2015 | Hernandez et al. |
| 2016/0019762 A1* | 1/2016 | Levesque ................. G06F 3/041 340/407.1 |
| 2016/0042228 A1 | 2/2016 | Opalka et al. |
| 2016/0066834 A1 | 3/2016 | Baldwin et al. |
| 2016/0071382 A1 | 3/2016 | Baldwin et al. |
| 2016/0071383 A1 | 3/2016 | Baldwin et al. |
| 2016/0073296 A1 | 3/2016 | Baldwin et al. |
| 2016/0088380 A1* | 3/2016 | Stauber ................. G10K 11/02 381/71.2 |
| 2016/0109951 A1* | 4/2016 | Baldwin ................. G06F 3/017 340/12.5 |
| 2016/0154468 A1* | 6/2016 | Kimmel ................. G06F 3/017 345/156 |
| 2019/0038260 A1* | 2/2019 | Lee ........................ A61B 8/468 |

FOREIGN PATENT DOCUMENTS

| | | |
|---|---|---|
| CA | 1207883 | 7/1986 |
| EP | 0712114 | 5/1996 |
| EP | 0921753 | 6/1999 |
| EP | 1436804 | 2/2004 |
| EP | 2312997 | 4/2011 |
| EP | 2643981 | 5/2012 |
| EP | 2483677 | 8/2012 |
| GB | 2226931 | 7/1990 |
| GB | 2348086 | 9/2000 |
| JP | 02249017 | 10/1990 |
| JP | 04-317638 A | 11/1992 |
| JP | 2003058190 | 2/2003 |
| JP | 2005142729 | 6/2005 |
| JP | 2010210730 | 9/2010 |
| KR | 20100056688 | 10/1990 |
| TW | 200946887 | 8/1997 |
| WO | WO 8201329 | 4/1982 |
| WO | WO 9601585 | 1/1996 |
| WO | WO 2003033882 | 4/2003 |
| WO | WO 2006094372 | 9/2006 |
| WO | WO 2009001881 | 12/2008 |
| WO | WO 2010045158 | 4/2010 |
| WO | WO 2012168534 | 12/2012 |

OTHER PUBLICATIONS

U.S. Office Action dated Jun. 11, 2019 in U.S. Appl. No. 16/403,685.

Zhong et al., "OsteoConduct: Wireless Body-Area Communication based on Bone Conduction," Proceeding of the ICST 2nd International Conference on Body Area Networks, BodyNets 2007.

Travis et al., "Hambone: A bio-acoustic gesture interface," 2007 11th IEEE International Symposium on Wearable Computers, 2007.

Scanlon, Michael V. Acoustic sensor for health status monitoring. Army Research Lab Aberdeen Proving Ground MD, 1998.

Yamada, Guillaume Lopez; Masaki Shuzo; Ichiro. "New healthcare society supported by wearable sensors and information mapping-based services." International Journal of Networking and Virtual Organisations 9.3 (2011): 233-247.

Scanlon, Michael V. "Acoustic sensors in the helmet detect voice and physiology." AeroSense 2003. International Society for Optics and Photonics, 2003.

Amento et al., "The Sound of One Hand: A Wrist-Mounted Bio-Acoustic Fingertip Gesture Interface," Short Talk: It's All About Sound, CHI 2002.

"Kinect Gestures," retrieved from http://support.xbox.com/en-US/xbox-360/kinect/body-controller on Oct. 24, 2013.

Mark Billinghurst, "Chapter 14: Gesture Based Interaction," Haptic Input, Aug. 24, 2011.

Kompis, Martin, and Rudolf Haeusler, "Electromagnetic interference of bone-anchored hearing aids by cellular phones revisited," Acta oto-laryngologica 122.5, 2002, 510-512.

Chris Harrison, Desney Tan, Dan Morris, "Skinput: Appropriating the Skin as an Interactive Canvas," CommuniCations of the ACM 54.8, 2011, 111-118.

T. Scott Saponas, et al., "Enabling always-available input with muscle-computer interfaces," Proceedings of the 22nd Annual ACM Symposium on User Interface Software and Technology, ACM, 2009.

Jao Henrique Donker, "The Body as a communication medium," 2009.

Sang-Yoon Chang, et al., "Body Area Network Security: Robust Key Establishment Using Human Body Channel," retrieved from https://www.usenix.org/system/files/conference/healthsec12/healthsec12-final15.pdf on Oct. 16, 2013.

Vidya Bharrgavi, et al., "Security Solution for Data Integrity in Wireless BioSensor Networks," Distributed Computing Systems Workshops, 2007, ICDCSW'07, 27th International Conference, IEEE, 2007.

Daniel Halperin, et al., "Pacemakers and Implantable Cardiac Defibrillators: Software Radio Attacks and Zero-Power Defenses," Security and Privacy, SP 2008, IEEE Symposium, IEEE, 2008.

Carmen C. Y. Poon, et al., "A Novel Biometrics Method to Secure Wireless Body Area Sensor Networks for Telemedicine and M-Health," Communications Magazine, IEEE 44.4, 2006, 73-81.

Zicheng Liu, et al., "Direct Filtering for Air-and Bone-Conductive Microphones," Multimedia Signal Processing, 2004 IEEE 6th Workshop, IEEE, 2004.

Mujibiya, Adiyan, et al. "The sound of touch: on-body touch and gesture sensing based on transdermal ultrasound propagation." Proceedings of the 2013 ACM international conference on Interactive tabletops and surfaces. ACM, 2013.

Harrison, Chris, Robert Xiao, and Scott Hudson. "Acoustic barcodes: passive, durable and inexpensive notched identification tags." Proceedings of the 25th annual ACM symposium on User interface software and technology. ACM, 2012.

Yoo, Jerald, Namjun Cho, and Hoi-Jun Yoo. "Analysis of body sensor network using human body as the channel." Proceedings of

(56) References Cited

OTHER PUBLICATIONS the ICST 3rd international conference on Body area networks. ICST (Institute for Computer Sciences, Social-Informatics and Telecommunications Engineering), 2008.
Ni, Tao, and Patrick Baudisch. "Disappearing mobile devices." Proceedings of the 22nd annual ACM symposium on User interface software and technology. ACM, 2009.
"Hinckley, Ken, and Hyunyoung Song, Sensor synaesthesia: touch in motion, and motion in touch." Proceedings of the SIGCHI Conference on Human Factors in Computing Systems. ACM, 2011.
Hinge, Dhanashree, and S. D. Sawarkar. "Mobile to Mobile data transfer through Human Area Network." IJRCCT 2.11 (2013): 1181-1184.
Park, Duck Gun, et al. "TAP: touch-and-play." Proceedings of the SIGCHI conference on Human Factors in computing systems. ACM, 2006.
Ruiz, J. Agud, and Shigeru Shimamoto. "A study on the transmission characteristics of the human body towards broadband intra-body communications." Consumer Electronics, 2005.(ISCE 2005). Proceedings of the Ninth International Symposium on. IEEE, 2005.
Nagai, Ryoji, et al. "Near-Field Coupling Communication Technology for Human-Area Networking." Proc. Conf. on Information and Communication Technologies and Applications (ICTA2011), International Institute of Informatics and Systems (IIIS). 2012.
Lipkova, Jolana, and Jaroslav Cechak. "Transmission of Information Using the Human Body," http://www.iiis.org/cds2010/cd2010imc/ccct_2010/paperspdf/ta303gi.pdf, CCCT 2010.
Maruf, Md Hasan. "An Input Amplifier for Body-Channel Communication." (2013).
Rekimoto, Jun. "Gesturewrist and gesturepad: Unobtrusive wearable interaction devices." Wearable Computers, 2001. Proceedings. Fifth International Symposium on. IEEE, 2001.
Fukumoto et al., "Whisper: A Wristwatch Style Wearable Headset," CHI 99, May 1999, pp. 112-119.
Fukumoto et al., "Body Coupled FingeRing Wireless Wearable Keyboard," CHI 97, Mar. 1997, pp. 147-154.
Matsushita et al., "Wearable Key Device for Personalizing Nearby Environment, Proceedings of the Fourth International Symposium on Wearable Computers" (ISWC'00), Feb. 2000, pp. 1-8.
U.S. Office Action dated Mar. 8, 2010 in U.S. Appl. No. 11/586,142.
U.S. Office Action dated Aug. 12, 2010 in U.S. Appl. No. 11/586,142.
Examiner's Answer to Appeal Brief dated Apr. 22, 2011 in U.S. Appl. No. 11/586,142.
Patent Board Decision dated Sep. 25, 2014 in U.S. Appl. No. 11/586,142.
U.S. Notice of Allowance dated Dec. 18, 2014 in U.S. Appl. No. 11/586,142.
U.S. Office Action dated Aug. 25, 2015 in U.S. Appl. No. 11/586,142.
U.S. Office Action dated Feb. 13, 2013 in U.S. Appl. No. 13/309,124.
U.S. Office Action dated Sep. 24, 2013 in U.S. Appl. No. 13/309,124.
U.S. Office Action dated Jan. 29, 2014 in U.S. Appl. No. 13/309,124.
U.S. Office Action dated Dec. 17, 2015 in U.S. Appl. No. 14/065,663.
U.S. Office Action dated Apr. 7, 2017 in U.S. Appl. No. 14/065,663.
U.S. Notice of Allowance dated Aug. 21, 2017 in U.S. Appl. No. 14/065,663.
U.S. Office Action dated Feb. 25, 2016 in U.S. Appl. No. 14/072,126.
U.S. Office Action dated Jul. 7, 2016 in U.S. Appl. No. 14/072,126.
U.S. Office Action dated Aug. 25, 2015 in U.S. Appl. No. 14/083,094.
U.S. Office Action dated Jun. 25, 2015 in U.S. Appl. No. 14/083,110.
U.S. Office Action dated Nov. 19, 2015 in U.S. Appl. No. 14/083,499.
U.S. Notice of Allowance dated Apr. 4, 2016 in U.S. Appl. No. 14/083,499.
U.S. Office Action dated Nov. 19, 2015 in U.S. Appl. No. 14/090,668.
U.S. Notice of Allowance dated Mar. 21, 2016 in U.S. Appl. No. 14/090,668.
U.S. Office Action dated Oct. 20, 2016 in U.S. Appl. No. 14/482,078.
U.S. Office Action dated Jun. 1, 2017 in U.S. Appl. No. 14/482,078.
U.S. Office Action dated Mar. 16, 2016 in U.S. Appl. No. 14/482,087.
U.S. Office Action dated Mar. 10, 2016 in U.S. Appl. No. 14/482,091.
U.S. Notice of Allowance dated Jul. 12, 2016 in U.S. Appl. No. 14/482,091.
U.S. Office Action dated Sep. 14, 2016 in U.S. Appl. No. 14/482,101.
U.S. Notice of Allowance dated Nov. 17, 2017 in U.S. Appl. No. 14/482,101.
U.S. Office Action dated Jan. 11, 2016 in U.S. Appl. No. 14/514,658.
U.S. Office Action dated Dec. 14, 2016 in U.S. Appl. No. 14/561,549.
U.S. Office Action dated Aug. 17, 2016 in U.S. Appl. No. 15/161,499.
U.S. Office Action dated May 10, 2017 in U.S. Appl. No. 15/161,499.
U.S. Notice of Allowance dated Oct. 7, 2016 in U.S. Appl. No. 15/224,808.
U.S. Notice of Allowance dated Mar. 28, 2017 in U.S. Appl. No. 15/224,808.
U.S. Office Action dated Dec. 13, 2017 in U.S. Appl. No. 15/250,375.
U.S. Office Action dated Apr. 5, 2018 in U.S. Appl. No. 15/250,375.
U.S. Office Action dated Apr. 21, 2017 in U.S. Appl. No. 15/450,624.
U.S. Notice of Allowance dated Aug. 22, 2017 in U.S. Appl. No. 15/450,624.
U.S. Office Action dated Mar. 22, 2018 in U.S. Appl. No. 15/450,624.

* cited by examiner

SURFACE INTERFACE

BACKGROUND

Humans interact with devices in various ways. Keyboards, mice, and trackpads, for example, have been used for years to facilitate user interaction with computers and are still relevant input mechanisms for providing accurate input control with excellent tactile feedback. One downside of these input mechanisms, however, is limited customizability. Apart from adding additional keys and allowing for custom key bindings, keyboards are still restrained by the requirement to function correctly across a wide range of applications. Touchscreens, on the other hand, allow near limitless customizability since touchscreens can be customized through software to display any soft button or other graphical user interface ("GUI") element, and do not rely on hardware keys and buttons to be mapped to particular functions of a given application. For these reasons, touchscreens have come to dominate user input for many devices, including smartphones, tablets, and even personal computers. Existing touchscreen interfaces, however, are relatively small, have a fixed size, and typically cannot be shared by multiple concurrent users. As such, each touchscreen user must have his/her own interface which limits collaboration and isolates each user to some extent. Moreover, all interactions are scaled to fit on the same-sized interface which can make some interactions convoluted.

SUMMARY

Concepts and technologies are disclosed herein for a surface interface. According to one aspect of the concepts and technologies disclosed herein, a system can include a plurality of surface transducers, a user transducer, and a user device. The plurality of surface transducers are in contact with a surface that is to be used as an input interface for a user. The user transducer is in contact with the user. The user device can include a processor and memory. The memory can store instructions that, when executed by the processor, cause the processor to perform operations. In particular, the processor can analyze a received portion of a signal to determine a relative location of a part of a body of the user on the surface, and can perform a function responsive to the relative location of the part of the body of the user on the surface.

In some embodiments, the signal includes a user-originated signal that is sent by the user transducer through the body of the user towards the surface. The received portion can be received from a surface transducer of the plurality of surface transducers. In some embodiments, the processor can analyze a second received portion of the signal to determine the relative location of the part of the body of the user on the surface. The second received portion of the signal can be received from a second surface transducer of the plurality of surface transducers.

In some embodiments, the signal includes a surface-originated signal that is sent by a surface transducer of the plurality of surface transducers towards the body of the user. The received portion, in these embodiments, includes a portion of the surface-originated signal that is received by the user transducer. Additional portions of the surface-originated signal can be received from other surface transducers of the plurality of surface transducers.

According to another aspect of the concepts and technologies disclosed herein, a user transducer can send a signal towards a surface that is to be used as an input interface for a user device associated with a user. The surface can include a plurality of surface transducers in contact therewith. Each surface transducer of the plurality of surface transducers can communicate a received portion of the signal to the user device. The user device can analyze the received portion of the signal from each surface transducer of the plurality of surface transducers to determine a relative location of contact on the surface. The user device can perform a function responsive to the relative location of contact on the surface.

In some embodiments, the user transducer is in contact with the user. The signal, in these embodiments, can traverse at least a part of a body of the user. In some other embodiments, the signal also can traverse a stylus that is in contact with the surface. The relative location of contact on the surface, in these embodiments, can include the relative location of contact by the stylus on the surface.

In some embodiments, the user transducer is in contact with a stylus. In these embodiments, the signal can traverse the stylus. The relative location of contact on the surface, in these embodiments, can include the relative location of contact by the stylus on the surface.

In some embodiments, the relative location of contact on the surface includes the relative location of contact by at least a part of the user's body at a single contact point on the surface. In other embodiments, the relative location of contact on the surface includes the relative location of contact by at least two parts of the user's body at two distinct contact points.

According to another aspect of concepts and technologies disclosed herein, each surface transducer of a plurality of surface transducers in contact with a surface can send a signal through the surface and a body of a user towards a user transducer that is in contact with the user. The user transducer can communicate a plurality of the received portions of the signal to a user device associated with the user. Each received portion of the plurality of received portions can correspond to a surface transducer of the plurality of surface transducers. The user device can analyze the plurality of received portions of the signal to determine a relative location of a part of the body of the user on the surface. The user device can perform a function responsive to the relative location. In some embodiments, the user transducer is in contact with the user through a stylus.

In some embodiments, the plurality of surface transducers are arranged in a centralized surface transducer configuration of a single transducer device. Alternatively, the plurality of surface transducers can be arranged in a distributed surface transducer configuration.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
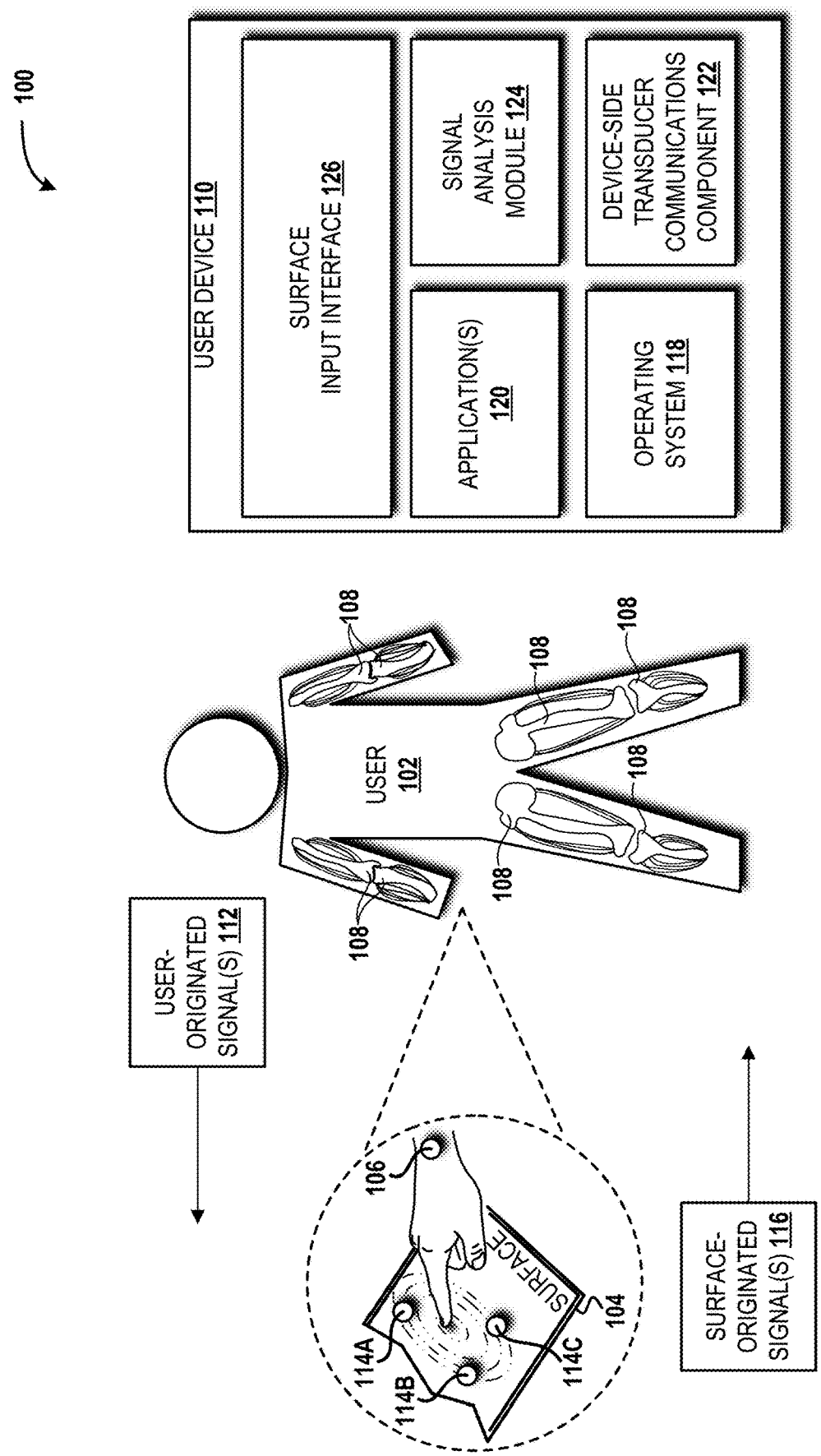
FIG. 1 is a block diagram illustrating aspects of an illustrative system implementing various concepts disclosed herein, according to an illustrative embodiment.

The following detailed description is directed to a surface interface. More particularly, by using bone conduction technology, any surface can be turned into an input device. Additionally, the size of the interface area can be expanded and the interface can be shared by multiple concurrent users. The concepts and technologies described herein can support not only traditional touch gestures (e.g., swipe and tap), but also multi-touch gestures (e.g., two-handed pinch and stretch) as well as the use of input tools (e.g., a stylus and a dial).

According to one aspect of the concepts and technologies disclosed herein, bone conduction signals can be passed between surface transducers in, on, or attached to a surface and at least one user transducer in, on, or attached to a user. The bone conduction signals can be used to interpret movement and gestures performed by the user with one or more body parts (e.g., one or more fingers) in contact with the surface as input to a user device. The bone conduction signals can originate from the user transducer(s) (i.e., user-originated signal) or from the surface transducer(s) (i.e., surface-originated signal). The arrangement of the surface transducers can provide additional implementations as will be described herein. In some embodiments disclosed herein, a visualization of an input device (e.g., a keyboard) or other display can be projected onto the surface to create a fully-functional interface. Alternatively, the surface being used might be a display that, when combined with the concepts and technologies disclosed herein, becomes a fully-functional interface.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of a surface interface will be presented.

Referring now to FIG. 1, aspects of a system 100 in which various embodiments presented herein may be implemented will be described, according to an illustrative embodiment. The illustrated system 100 includes a user 102 who is in physical contact with a surface 104. In particular, the user 102 is touching the surface 104 with an index finger, and a user transducer 106 is in contact with the user 102 (e.g., the user transducer 106 is in, on, or attached to a part of a body of the user 102). Although one user transducer 106 is shown in the illustrated example, multiple user transducers 106 can be used in various embodiments disclosed herein.

The user's 102 body has a plurality of bones 108 ("bones 108") through which one or more signals can propagate, a process referred to herein as "bone conduction." It should be understood that a portion of a given bone conduction signal may propagate through other parts of the user's 102 body, such as fat, organ tissue, blood vessels, skin, and/or other tissue in addition to one or more of the bones 108.

The surface 104 can be any surface the user 102 can touch. The surface 104 might be, for example, at least a portion of a floor, a ceiling, a wall, a piece of furniture, a piece of art or other decoration, a portion of a user device 110 (e.g., a case, a screen/display, a keyboard, and/or a physical button), another device, a body of another user, an animal, clothing, footwear, handwear, headwear, jewelry, accessory, a vehicle, an object, or a food. The surface 104 can include a single surface or multiple surfaces. The surface 104 can be made from one or more materials. In some embodiments, the surface 104 is made from a composite material.

The user transducer 106 can transmit one or more bone conduction signals, such as one or more user-originated signals 112, through at least a portion of the user's 102 body towards the surface 104. The user transducer 106, additionally or alternatively, can receive one or more bone conduction signals or one or more portions thereof from one or more of a plurality of surface transducers 114. In the illustrated example, the plurality of surface transducers 114 includes a first surface transducer 114A, a second surface transducer 114B, and a third surface transducer 114C in, on, or attached to the surface 104. The surface transducers 114 can transmit one or more bone conduction signals, such as one or more surface-originated signals 116, to the user's 102 body to be received, at least in part, by the user transducer 106. The user transducer(s) 106 and the surface transducers 114, in some embodiments, are piezoelectric transducers, such as contact microphones or other electro-acoustic transducers.

The user device 110 can be a smartphone, feature phone, personal digital assistant ("PDA"), tablet device, laptop computer, desktop computer, server computer, video game system, handheld video game system, media player, set-top box, vehicle computing system, smart watch, television, consumer electronic device, personal tracker or safety device, dumbbell or other fitness equipment, other computing device, a combination thereof, or the like. It should be understood that the functionality of the user device 110 can be provided by a single device, by two or more similar devices, and/or by two or more dissimilar devices.

The illustrated user device 110 includes an operating system 118, one or more applications 120, a device-side transducer communications component 122, a signal analysis module 124, and a surface input interface 126. The operating system 118 is a program for controlling the operation of the user device 110. In some embodiments, the operating system 118 includes the signal analysis module 124, which is described in greater detail below. The operating system 118 can be executed by one or more processor(s) (best shown in FIG. 6) to cause the user device 110 to perform various operations. The operating system 118 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The user device 110 can utilize one or more processor(s) (best shown in FIG. 6) to execute the application(s) 120. The application(s) 120 can include, but are not limited to, fitness applications, productivity applications, entertainment applications, video applications, music applications, video game applications, camera applications, messaging applications, social network applications, enterprise applications, map applications, security applications, presence applications, email applications, calendar applications, camera applications, web browser applications, any other application capable of being executed by the processor(s) to cause the user device 110 to perform one or more operations, or some combination thereof.

The device-side transducer communications component 122 can be or can include one or more transceivers configured to communicate with the user transducer(s) 106 and the surface transducers 114. In some embodiments, the device-side transducer communications component 122 can communicate with the user transducer(s) 106 and the surface transducers 114 using various communications technologies such as, for example, WI-FI, WIMAX, BLUETOOTH, infrared, infrared data association ("IRDA"), near-field communications ("NFC"), ZIGBEE, Z-WAVE, other proprietary or non-proprietary RF technologies, combinations thereof, and the like. In some embodiments, the device-side transducer communications component 122 includes one or more transceivers that operate in accordance with one or more wireless telecommunications technologies such as, for example, Global System for Mobile communication ("GSM"), Code Division Multiple Access ("CDMA"), CDMAONE, CDMA2000, Long-Term Evolution ("LTE"), and various other 2G, 2.5G, 3G, 4G, 5G, and greater generation technology standards. Moreover, the device-side transducer communications component 122 may facilitate communications over various channel access methods (which may or may not be used by the aforementioned standards) including, but not limited to, Time Division Multiple Access ("TDMA"), Frequency Division Multiple Access ("FDMA"), Wideband CDMA ("W-CDMA"), Orthogonal Frequency-Division multiplexing ("OFDM"), Space-Division Multiple Access ("SDMA"), and the like.

The user transducer(s) 106 and the surface transducers 114 can communicate characteristics of one or more bone conduction signals, such as the user-originated signal(s) 112 and/or the surface-originated signal(s) 116, to the signal analysis module 124. The signal analysis module 124 can analyze characteristics of the bone conduction signal(s) or one or more portions thereof to determine the relative location of the user's 102 contact with the surface 104 and the direction of movement (if any). In other embodiments, the user transducer(s) 106 and/or the surface transducers 114 include one or more processing components capable of performing, at least in part, the signal analysis and can report the results to the user device 110.

The body of the user 102 modifies bone conduction signals in unique ways. This enables the surface transducers 114 to distinguish between multiple users (not shown). The surface transducers 114 also can use characteristics of the received signal(s) to further distinguish between concurrent users. Moreover, differences between successive signals can be analyzed to enhance the accuracy of location and direction interpretations. Users also can be assigned unique waveforms allowing the surface transducers 114 to easily differentiate between multiple users. Similar functionality alternatively or additionally can be provided by the signal analysis module 124.

The surface input interface 126 can include software, firmware, hardware, or some combination thereof to support the surface 104, via the surface transducers 114 and the user transducer(s) 106, as an input device for the user device 110. The surface input interface 126 can provide a graphical user interface ("GUI") on a display (best shown in FIG. 6) of the user device 110 through which the user 102 can associate specific user input (e.g., single touch, multi-touch, or gestures) to the surface 104 with device functionality. The surface input interface 126 can include default associations. In some embodiments, the surface input interface 126 is provided, at least in part, by one or more of the applications 120 and/or the operating system 118.

The surface transducers 114 can be arranged differently to meet the needs of various use cases. One approach is to contain all transducers in a single device, as shown in FIG. 2A. This simplifies the system since the distance between the surface transducers 114 is fixed. This arrangement also reduces the number of physically separate components making it simpler and more intuitive for the user 102.

Turning now to FIG. 2A, a centralized surface transducer configuration 200 will be described, according to an illustrative embodiment. The centralized surface transducer configuration 200 includes a single transducer device 202 that, in turn, includes the surface transducers 114A-114C (introduced in FIG. 1) and a transducer-side transducer communications component 204. The transducer-side transducer communications component 204 can be or can include one or more transceivers configured to communicate with the user transducer(s) 106, enable communications among the surface transducers 114, and communicate with the device-side transducer communications component 122. In some embodiments, the transducer-side transducer communications component 204 can communicate with the user transducer(s) 106, the surface transducers 114, and/or the device-side transducer communications component 122 using various communications technologies such as, for example, WI-FI, WIMAX, BLUETOOTH, infrared, IRDA, NFC, ZIGBEE, Z-WAVE, other proprietary or non-proprietary RF technologies, combinations thereof, and the like. In some embodiments, the transducer-side transducer communications component 204 includes one or more transceivers that operate in accordance with one or more wireless telecommunications technologies such as, for example, GSM, CDMA, CDMAONE, CDMA2000, LTE, and various other 2G, 2.5G, 3G, 4G, 5G, and greater generation technology standards. Moreover, the transducer-side transducer communications component 204 may facilitate communications over various channel access methods (which may or may not be used by the aforementioned standards) including, but not limited to, TDMA, FDMA, W-CDMA, OFDM, SDMA, and the like.

Another possible arrangement of the surface transducers 114 is to distribute the surface transducers 114 across the surface 104. This arrangement improves accuracy for larger surfaces. This arrangement also enables the expansion of an input interface by adding one or more additional surface transducers 114 to the surface 104. The centralized arrangement and the distributed arrangement can be combined to reduce the total number of devices, increase the size of the interface, and/or to improve accuracy.

Figure 2B:
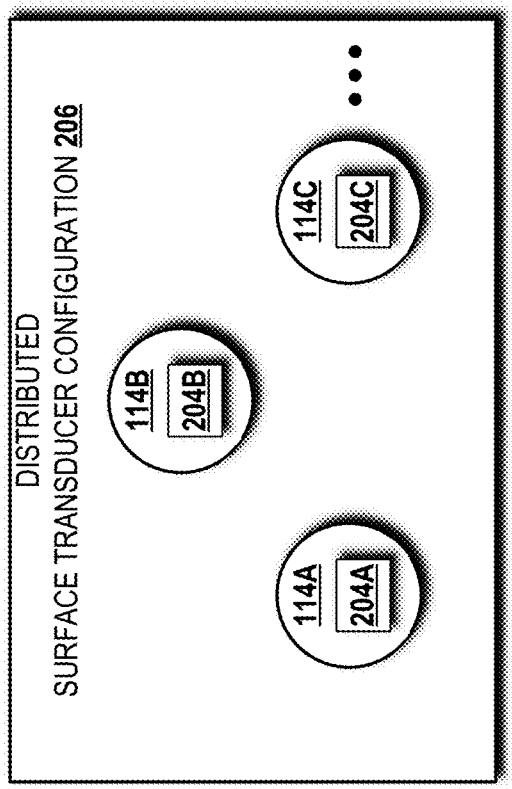
FIG. 2B is a block diagram illustrating a distributed surface transducer configuration, according to an illustrative embodiment.
Figure 2A:
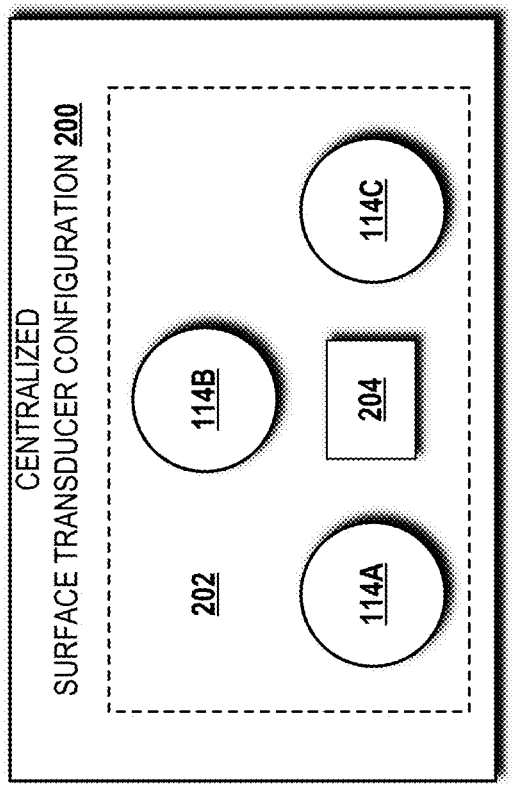
FIG. 2A is a block diagram illustrating a centralized surface transducer configuration, according to an illustrative embodiment.

Turning now to FIG. 2B, a distributed surface transducer configuration 206 will be described, according to an illustrative embodiment. The distributed surface transducer configuration 206 is representative of the configuration of the surface transducers 114A-114C shown on the surface 104 in FIG. 1. The distributed surface transducer configuration 206 includes the surface transducers 114A, 114B, 114C, each of which includes a corresponding transducer-side transducer communications component 204A, 204B, 204C.

Figure 3A:
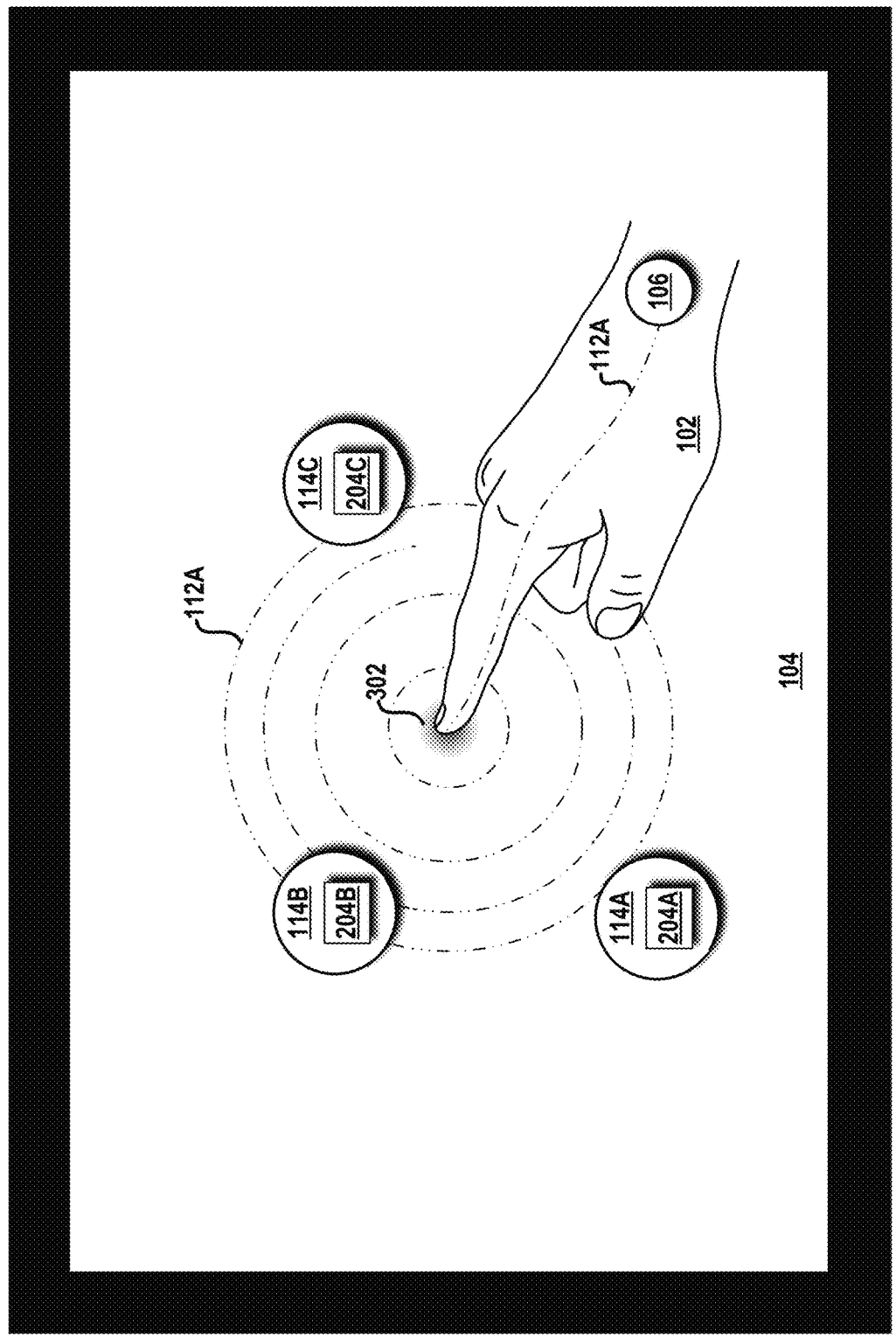
FIG. 3A is an example implementation of a surface interface using three surface transducers and one user transducer between which one bone conduction signal is used to determine a relative location of the user's contact with the surface and a direction of movement, according to an illustrative embodiment.

Turning now to FIG. 3A, an example implementation of a surface interface 300 using three surface transducers 114A, 114B, 114C and one user transducer 106 between which one bone conduction signal is used to determine a relative location of the user's 102 contact point 302 with the surface 104 and a direction of movement (if any) is shown, according to an illustrative embodiment. When the user 102 contacts the surface 104, a bone conduction signal, such as a user-originated signal 112A, is transmitted, by the user transducer 106, towards the surface 104, whereby the surface transducers 114A, 114B, 114C each receives at least a portion of the user-originated signal 112A. Characteristics of the user-originated signal 112A received at each of the surface transducers 114A, 114B, 114C are used to determine the relative location of the user's 102 contact point 302 with the surface 104 and the direction of movement (if any).

Figure 3B:
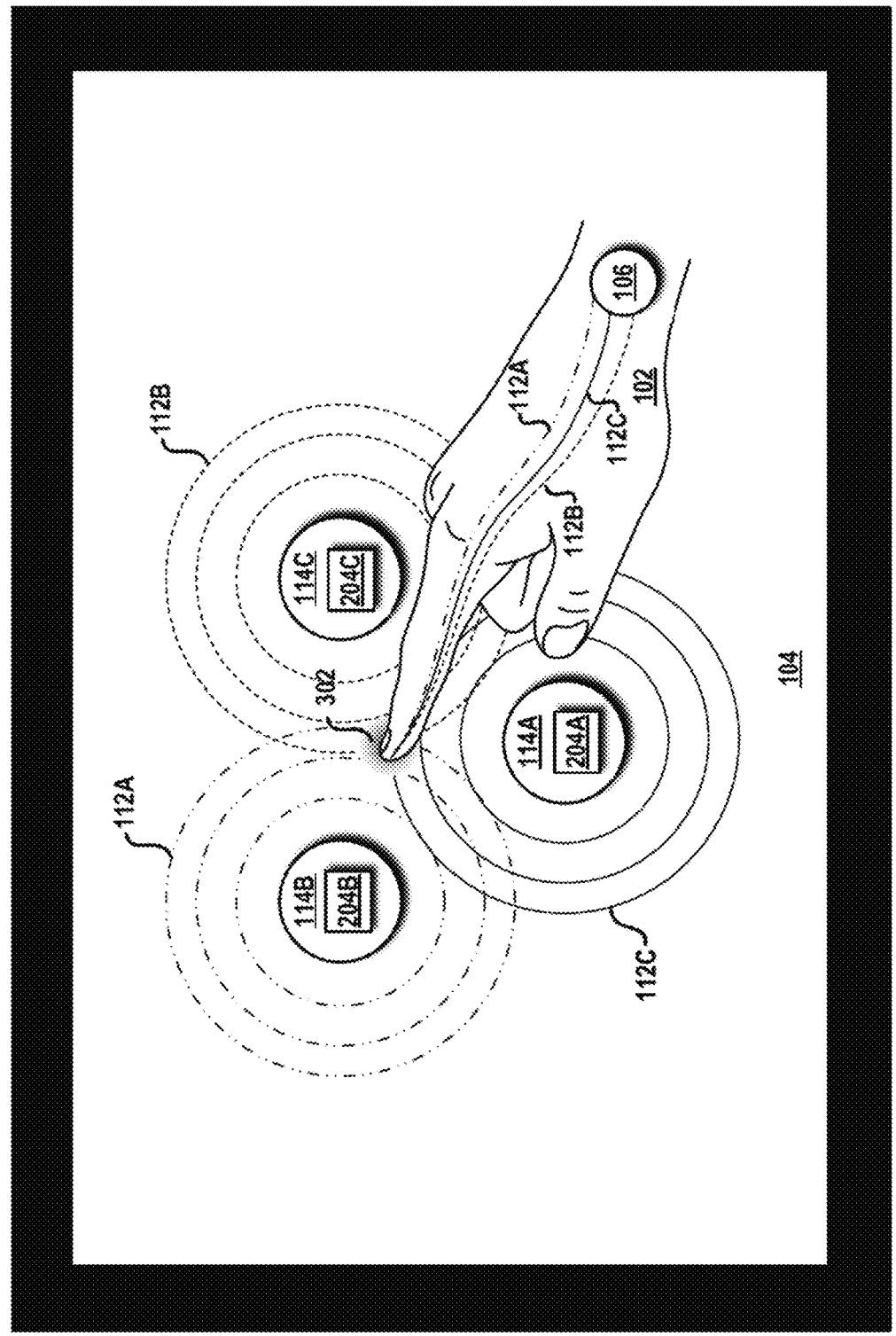
FIG. 3B is an example implementation of a surface interface using three surface transducers and one user transducer between which three bone conduction signals are used to determine a relative location of the user's contact with the surface and a direction of movement, according to an illustrative embodiment.

Turning now to FIG. 3B, an example implementation of the surface interface 300 using three surface transducers 114A, 114B, 114C and one user transducer 106 between which three bone conduction signals are used to determine a relative location of the user's 102 contact point 302 with the surface 104 and a direction of movement (if any) is shown, according to an illustrative embodiment. When the user 102 contacts the surface 104, three bone conduction signals, such as the user-originated signals 112A, 112B, 112C, are transmitted, by the user transducer 106, towards the surface 104, whereby the surface transducers 114A, 114B, 114C each receives at least a portion of each of the user-originated signals 112A, 112B, 112C. Characteristics of the user-originated signals 112A, 112B, 112C received at each of the surface transducers 114A, 114B, 114C are used to determine the relative location of the user's 102 contact point 302 with the surface 104 and the direction of movement (if any).

Figure 3C:
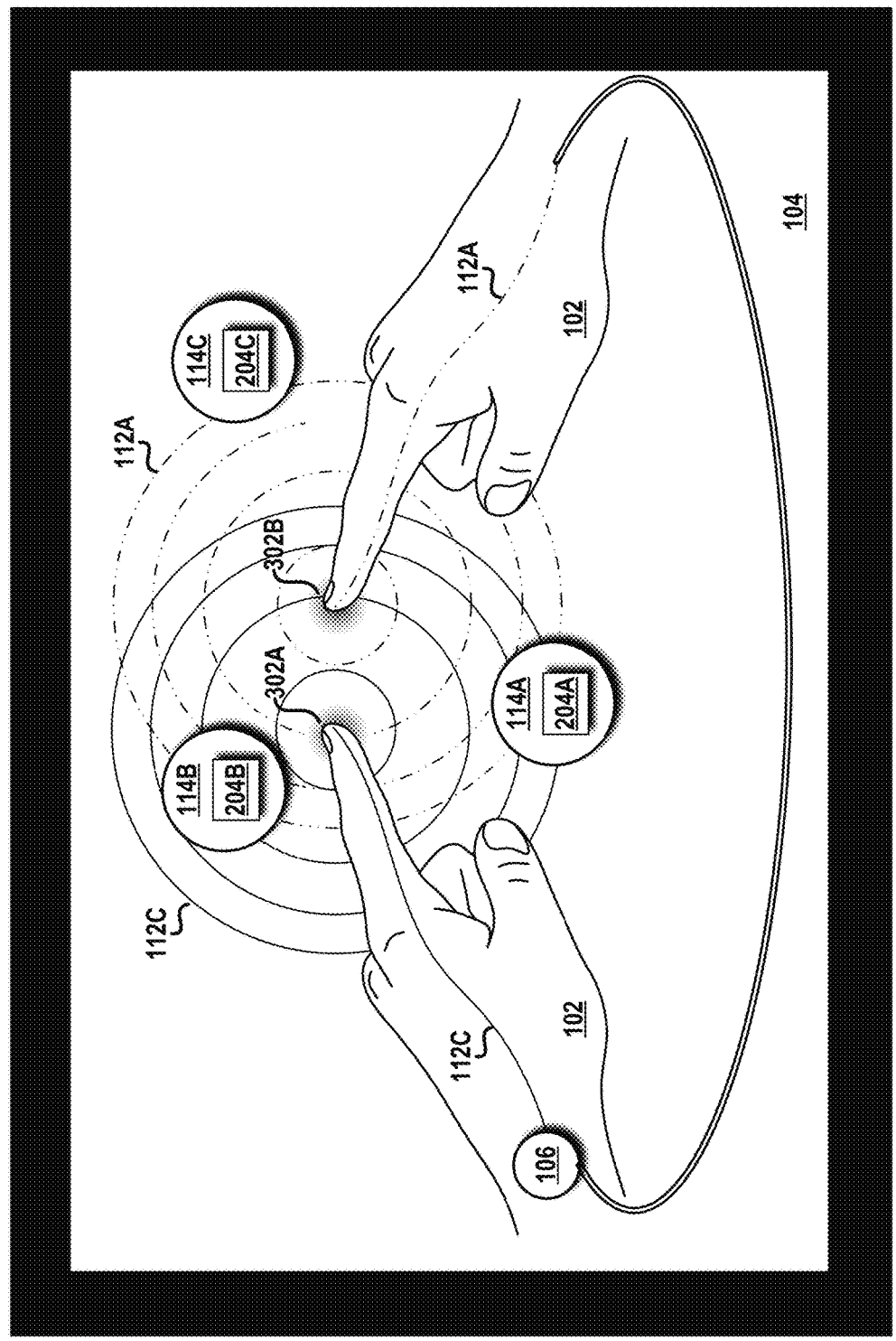
FIG. 3C is an example implementation of a multi-touch surface interface using three surface transducers and one user transducer between which two bone conduction signals corresponding to two contact points are used to determine a relative location of the user's contact with the surface and a direction of movement, according to an illustrative embodiment.

Turning now to FIG. 3C, an example implementation of a multi-touch surface interface 304 using three surface transducers 114A, 114B, 114C and one user transducer 106 between which two bone conduction signals are used to determine a relative location of the user's 102 contact points 302A, 302B with the surface 104 and a direction of movement (if any) is shown, according to an illustrative embodiment. When the user 102 contacts the surface 104, two bone conduction signals, such as the user-originated signals 112A, 112C, are transmitted, by the user transducer 106, towards the surface 104, whereby the surface transducers 114A, 114B, 114C each receive at least a portion of each of the user-originated signals 112A, 112C. Characteristics of the user-originated signals 112A, 112C received at each of the surface transducers 114A, 114B, 114C are used to determine the relative location of the user's 102 contact points 302A, 302B with the surface 104 and the direction of movement (if any).

Figure 3D:
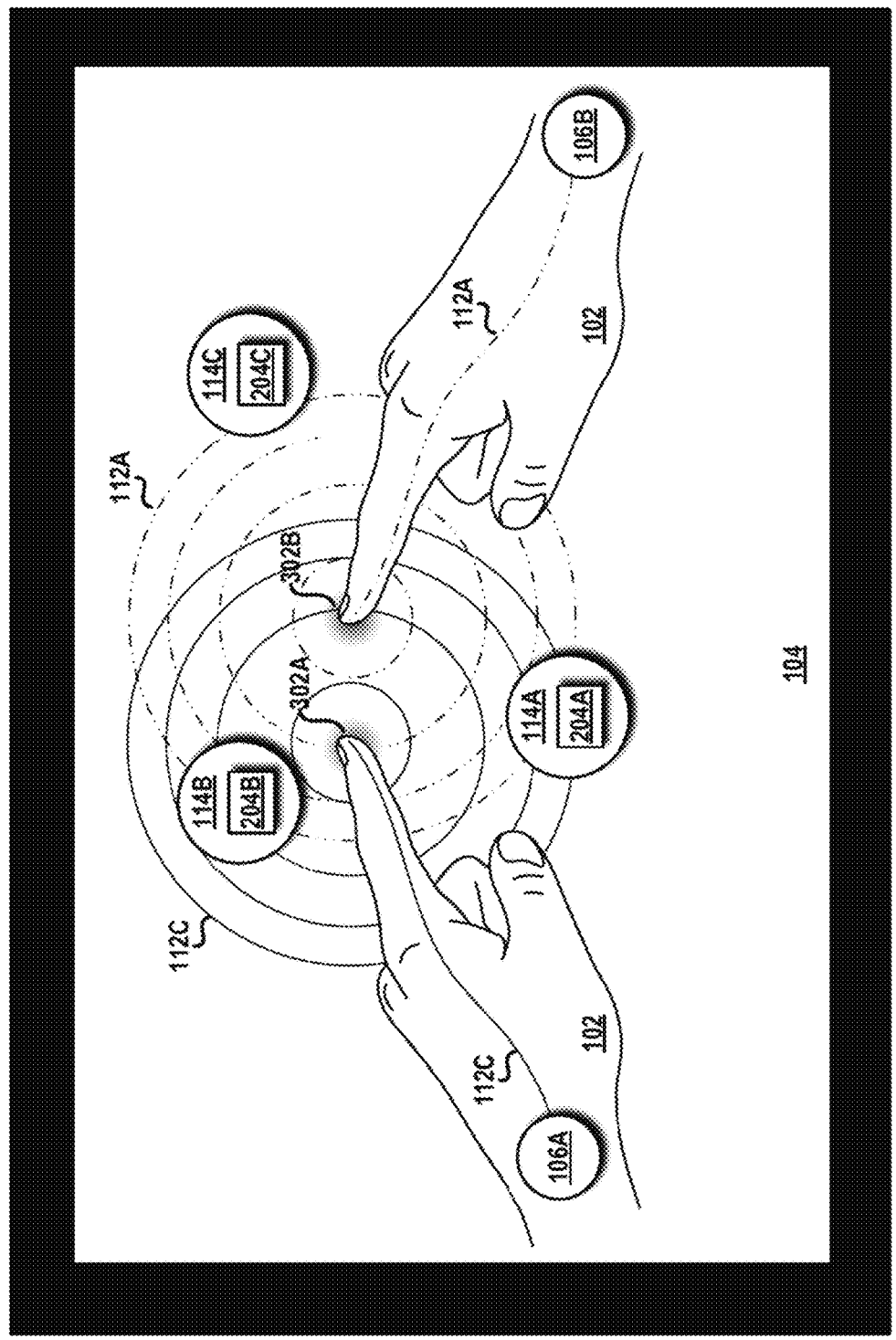
FIG. 3D is an example implementation of a multi-touch surface interface using three surface transducers and two user transducers between which two bone conduction signals corresponding to two contact points are used to determine a relative location of the user's contact with the surface and a direction of movement, according to an illustrative embodiment.

Turning now to FIG. 3D, an example implementation of the multi-touch surface interface 304 using three surface transducers 114A, 114B, 114C and two user transducers 106A, 106B between which two bone conduction signals are used to determine a relative location of the user's 102 contact points 302A, 302B with the surface 104 and a direction of movement (if any) is shown, according to an illustrative embodiment. When the user 102 contacts the surface 104, two bone conduction signals, such as the user-originated signals 112A, 112C, are transmitted, by the user transducers 106B, 106A, respectively, towards the surface 104, whereby the surface transducers 114A, 114B, 114C each receives at least a portion of each of the user-originated signals 112A, 112C. Characteristics of the user-originated signals 112A, 112C received at each of the surface transducers 114A, 114B, 114C are used to determine the relative location of the user's 102 contact points 302A, 302B with the surface 104 and the direction of movement (if any).

Figure 3E:
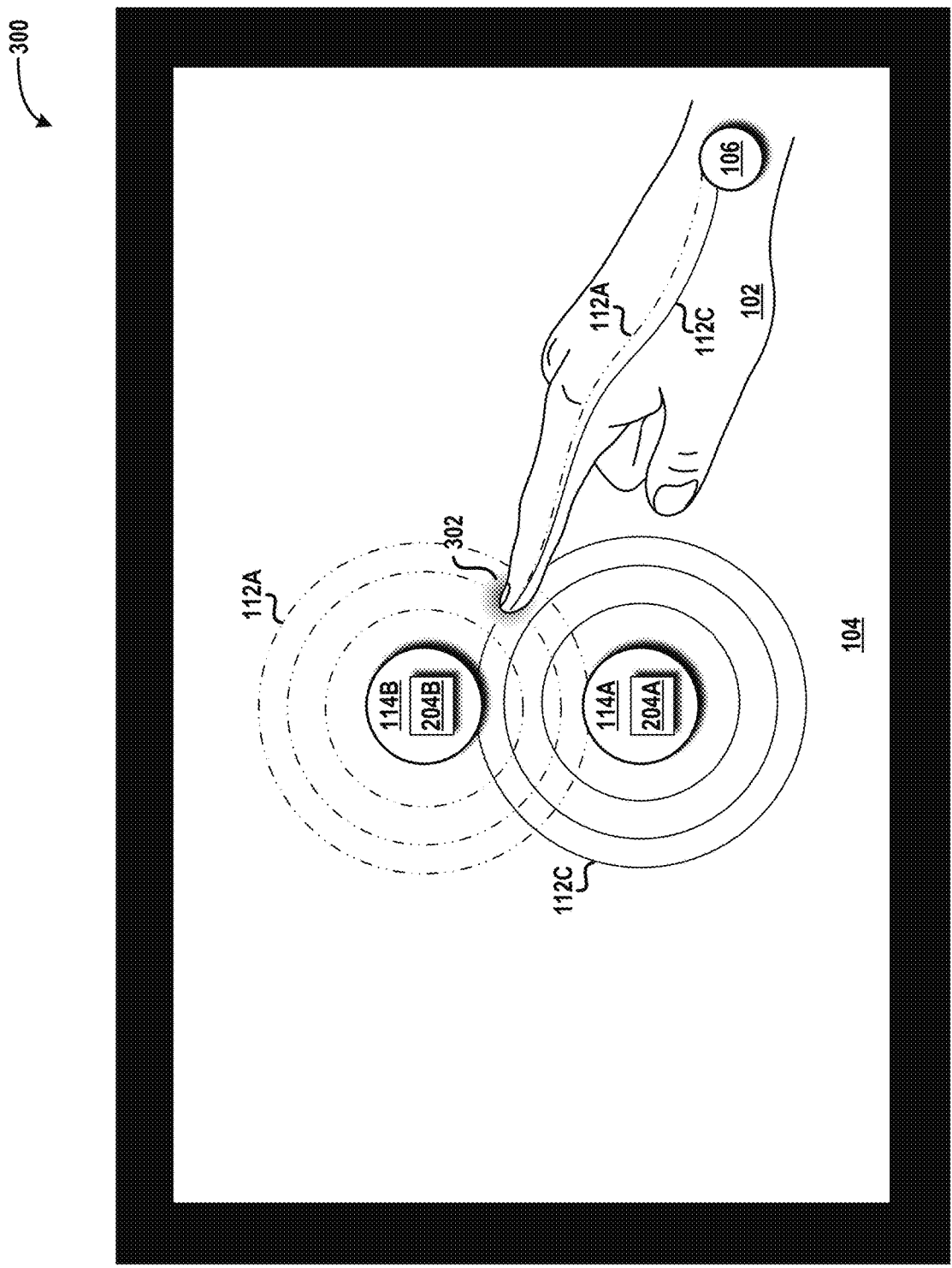
FIG. 3E is an example implementation of a surface interface using two surface transducers and one user transducer between which two bone conduction signals are used to determine a relative location of the user's contact with the surface and a direction of movement, according to an illustrative embodiment.

Turning now to FIG. 3E, an example implementation of the surface interface 300 using two surface transducers 114A, 114B and one user transducer 106 between which two bone conduction signals are used to determine a relative location of the user's 102 contact point 302 with the surface 104 and a direction of movement (if any) is shown, according to an illustrative embodiment. When the user 102 contacts the surface 104, two bone conduction signals, such as the user-originated signals 112A, 112C, are transmitted, by the user transducer 106 towards the surface 104, whereby the surface transducers 114A, 114B each receives at least a portion of each of the user-originated signals 112A, 112C. Characteristics of the user-originated signals 112A, 112C received at each of the surface transducers 114A, 114B are used to determine the relative location of the user's 102 contact points 302 with the surface 104 and the direction of movement (if any).

Figure 3F:
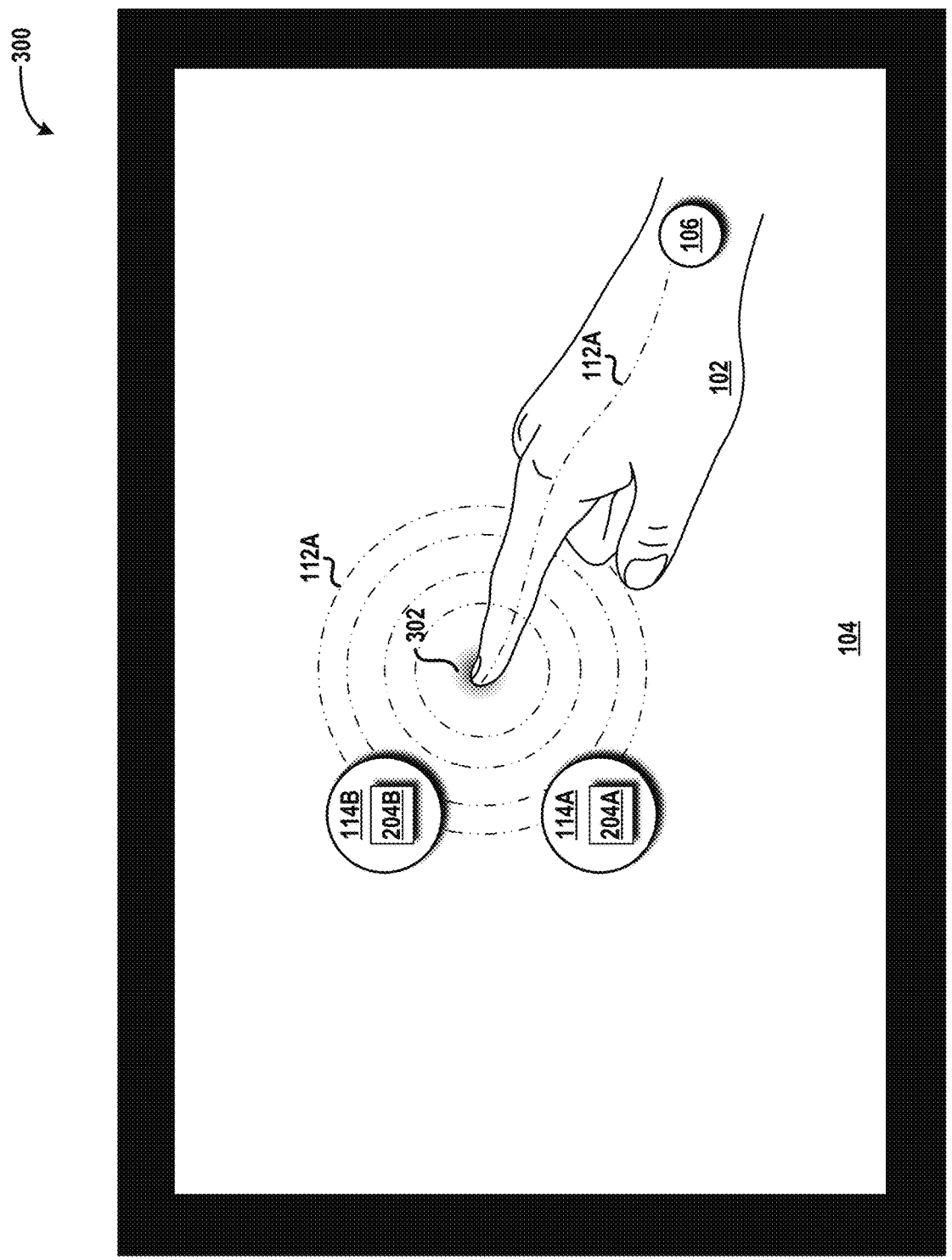
FIG. 3F is an example implementation of a surface interface using two surface transducers and one user transducer between which one bone conduction signal is used to determine a relative location of the user's contact with the surface and a direction of movement, according to an illustrative embodiment.

Turning now to FIG. 3F, an example implementation of the surface interface 300 using two surface transducers 114A, 114B and one user transducer 106 between which one bone conduction signal is used to determine a relative location of the user's 102 contact point 302 with the surface 104 and a direction of movement (if any) is shown, according to an illustrative embodiment. When the user 102 contacts the surface 104, one bone conduction signal, such as the user-originated signal 112A, is transmitted, by the user transducer 106, towards the surface 104, whereby the surface transducers 114A, 114B each receives at least a portion of each of the user-originated signal 112A. Characteristics of the user-originated signal 112A received at each of the surface transducers 114A, 114B are used to determine the relative location of the user's 102 contact point 302 with the surface 104 and the direction of movement (if any).

Figure 3G:
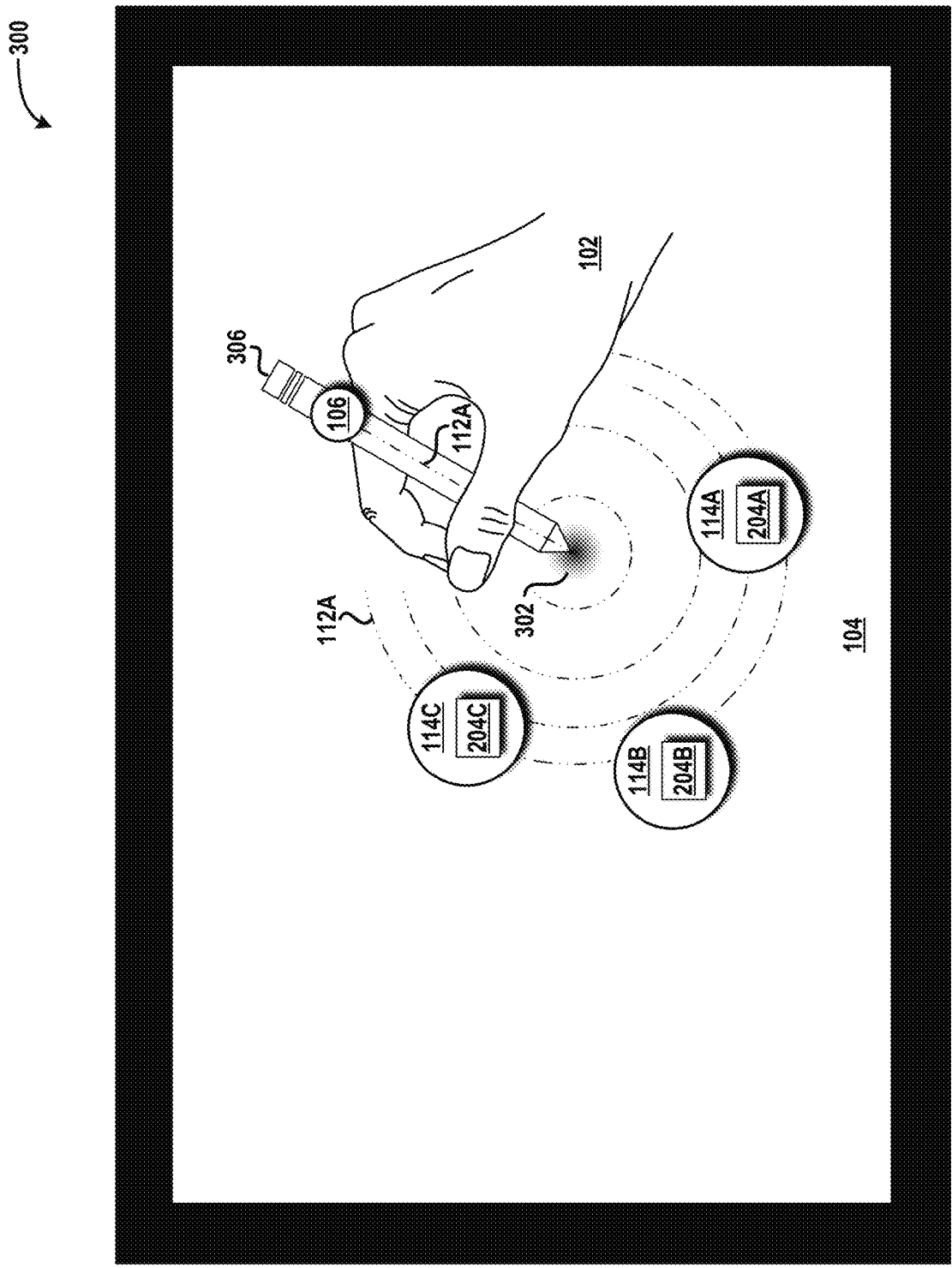
FIG. 3G is an example implementation of a surface interface using three surface transducers and one user transducer in, on, or attached to a stylus and between which one bone conduction signal is used to determine a relative location of the stylus's contact with the surface and a direction of movement, according to an illustrative embodiment.

Turning now to FIG. 3G, an example implementation of the surface interface 300 using three surface transducers 114A-114C and one user transducer 106 in, on, or attached to a stylus 306 and between which one bone conduction signal is used to determine a relative location of the stylus's 306 contact point 302 with the surface 104 and a direction of movement (if any) is shown, according to an illustrative embodiment. When the stylus 306 contacts the surface 104, one bone conduction signal, such as the user-originated signal 112A, is transmitted, by the user transducer 106 in, on, or attached to the stylus 306, towards the surface 104, whereby the surface transducers 114A, 114B, 114C each receives at least a portion of each of the user-originated signal 112A. Characteristics of the user-originated signal 112A received at each of the surface transducers 114A, 114B, 114C are used to determine the relative location of the stylus's 306 contact point 302 with the surface 104 and the direction of movement (if any).

Figure 3H:
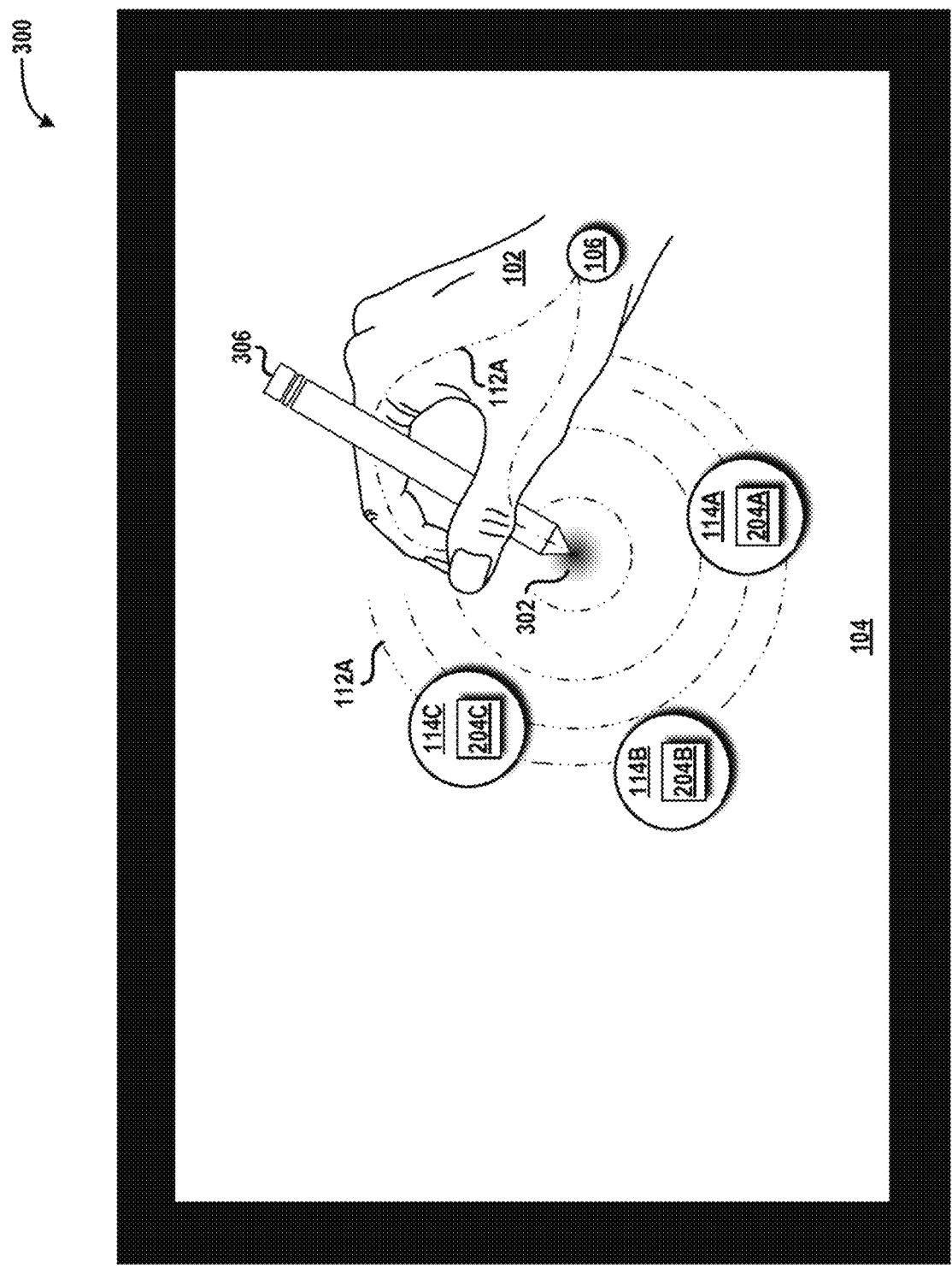
FIG. 3H is an example implementation of a surface interface using three surface transducers and one user transducer between which one bone conduction signal is used to determine a relative location of the stylus's contact with the surface and a direction of movement, according to an illustrative embodiment.

Turning now to FIG. 3H, an example implementation of the surface interface 300 using three surface transducers 114A, 114B, 114C and one user transducer 106 between which one bone conduction signal is used to determine a relative location of the stylus's 306 contact point 302 with the surface 104 and a direction of movement (if any) is shown, according to an illustrative embodiment. When the stylus 306 contacts the surface 104, one bone conduction signal, such as the user-originated signal 112A, is transmitted, by the user transducer 106, towards the surface 104, whereby the surface transducers 114A, 114B, 114C each receives at least a portion of each of the user-originated signal 112A. Characteristics of the user-originated signal 112A received at each of the surface transducers 114A, 114B, 114C are used to determine the relative location of the stylus's 306 contact point 302 with the surface 104 and the direction of movement (if any).

Figure 3I:
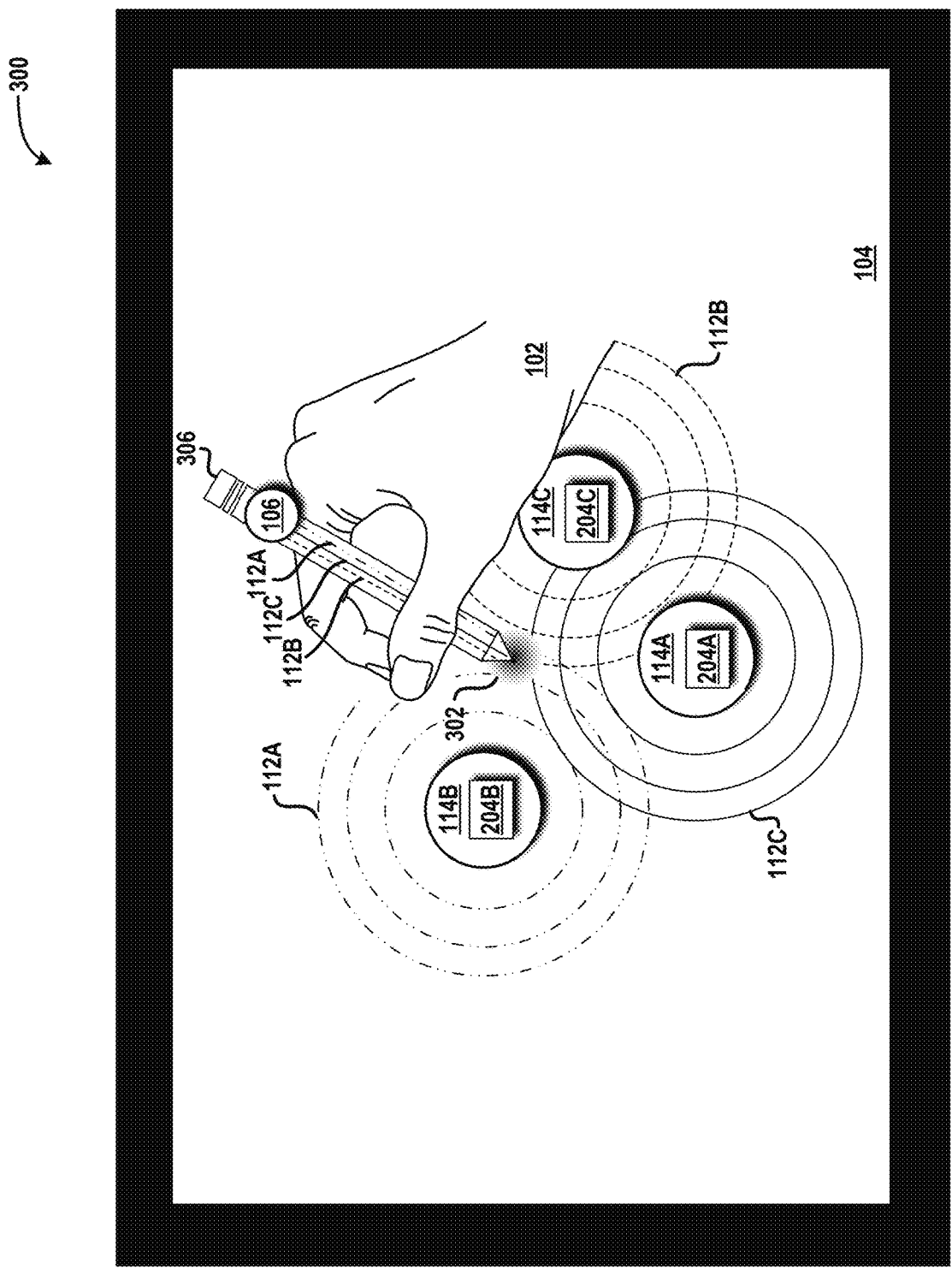
FIG. 3I is an example implementation of a surface interface using three surface transducers and one user transducer in, on, or attached to a stylus and between which three bone conduction signals are used to determine a relative location of the stylus's contact with the surface and a direction of movement, according to an illustrative embodiment.

Turning now to FIG. 3I, an example implementation of the surface interface 300 using three surface transducers 114A, 114B, 114C and one user transducer 106 in, on, or attached to the stylus 306 and between which three bone conduction signals are used to determine a relative location of the stylus's 306 contact point 302 with the surface 104 and a direction of movement (if any) is shown, according to an illustrative embodiment. When the stylus 306 contacts the surface 104, three bone conduction signals, such as the user-originated signals 112A, 112B, 112C, are transmitted, by the user transducer 106, towards the surface 104, whereby the surface transducers 114A, 114B, 114C each receives at least a portion of each of the user-originated signals 112A, 112B, 112C. Characteristics of the user-originated signals 112A, 112B, 112C received at each of the surface transducers 114A, 114B, 114C are used to determine the relative location of the stylus's 306 contact point 302 with the surface 104 and the direction of movement (if any).

Figure 4:
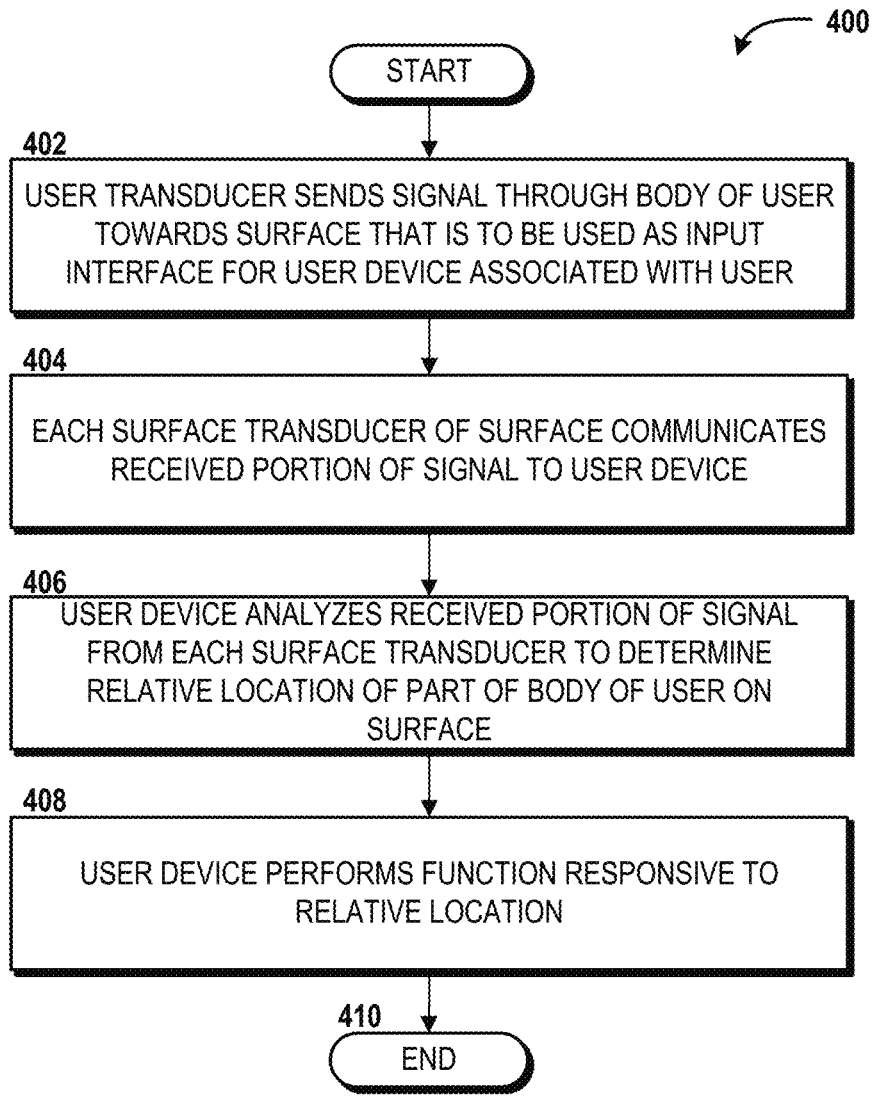
FIG. 4 is a flow diagram illustrating aspects of a method for using a user-originated signal to implement a surface as an input device, according to an illustrated embodiment.

Turning now to FIG. 4, aspects of a method 400 for using the user-originated signal 112 to implement the surface 104 as an input device for the user device 110 will be described, according to an illustrated embodiment. It should be understood that the operations of the methods are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in their respective entireties. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including the user device 110, the user transducer(s) 106, the surface transducer(s) 114, single-processor or multiprocessor systems, minicomputers, mainframe computers, personal computers, hand-held computing devices, microprocessor-based, programmable consumer electronics, other devices and systems disclosed herein, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof refers to causing a processor of a computing system or device, such as the user device 110, the user transducer(s) 106, the surface transducer(s) 114, another device disclosed herein, or another system disclosed herein, to perform one or more operations and/or causing the processor to direct other components of the computing system or device to perform one or more of the operations.

For purposes of illustrating and describing some of the concepts of the present disclosure, the methods disclosed herein are described as being performed, at least in part, by the such as the user device 110, the user transducer(s) 106, and/or the surface transducer(s) 114, another via execution of one or more software modules and/or software applications. It should be understood that additional and/or alternative devices and/or systems can provide the functionality described herein via execution of one or more modules, applications, and/or other software. Thus, the illustrated embodiments are illustrative, and should not be viewed as being limiting in any way.

The method 400 begins and proceeds to operation 402, where the user transducer 106 sends the user-originated signal 112 through the body of the user 102 towards the surface 104 that is to be used as an input interface for the user device 110 associated with the user 102. From operation 402, the method 400 proceeds to operation 404, where each surface transducer 114 of the surface 104 communicates at least a received portion of the user-originated signal 112 to the user device 110.

From operation 404, the method 400 proceeds to operation 406, where the user device 110 analyzes the received portion(s) of the user-originated signal 112 from each surface transducer 114 to determine a relative location of a part of the body of the user 102 on the surface 104. From operation 406, the method 400 proceeds to operation 408, where the user device 110 performs one or more functions responsive to the relative location determined at operation 406. From operation 408, the method 400 proceeds to operation 410, where the method 400 ends.

Figure 5:
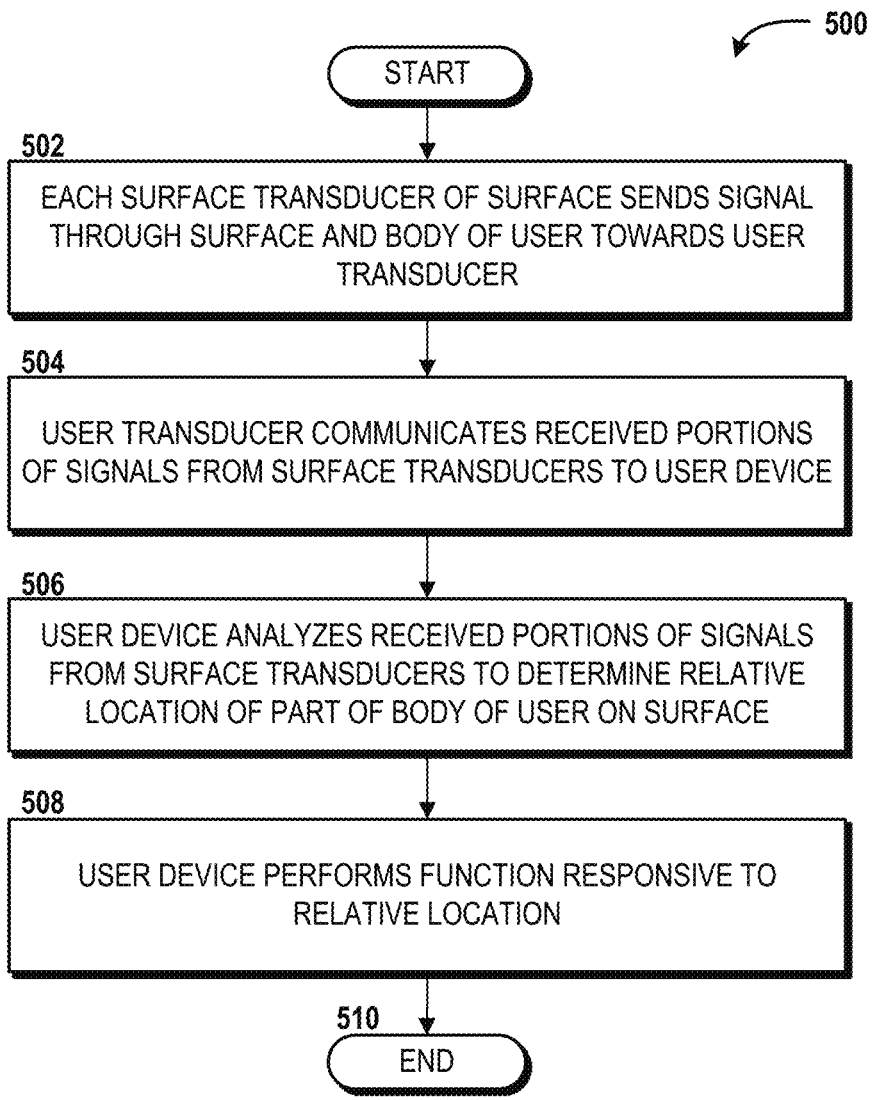
FIG. 5 is a flow diagram illustrating aspects of a method for using a surface-originated signal to implement a surface as an input device, according to an illustrated embodiment.

Turning now to FIG. 5, aspects of a method 500 for using the surface-originated signal 116 to implement the surface 104 as an input interface for the user device 110 will be described, according to an illustrated embodiment. The method 500 begins and proceeds to operation 502, where each of the surface transducers 114 of the surface 104 sends a surface-originated signal 116 through the surface 104 and the body of the user 102 towards the user transducer 106. From operation 502, the method proceeds to operation 504, where the user transducer 106 communicates the received portions of the surface-originated signals 116 to the user device 110.

From operation 504, the method 500 proceeds to operation 506, where the user device 110 analyzes the received portions of the surface-originated signals 116 from each surface transducer 114 to determine a relative location of a part of the body of the user 102 on the surface 104. From operation 506, the method 500 proceeds to operation 508, where the user device 110 performs one or more functions responsive to the relative location determined at operation 506. From operation 508, the method 500 proceeds to operation 510, where the method 500 ends.

Figure 6:
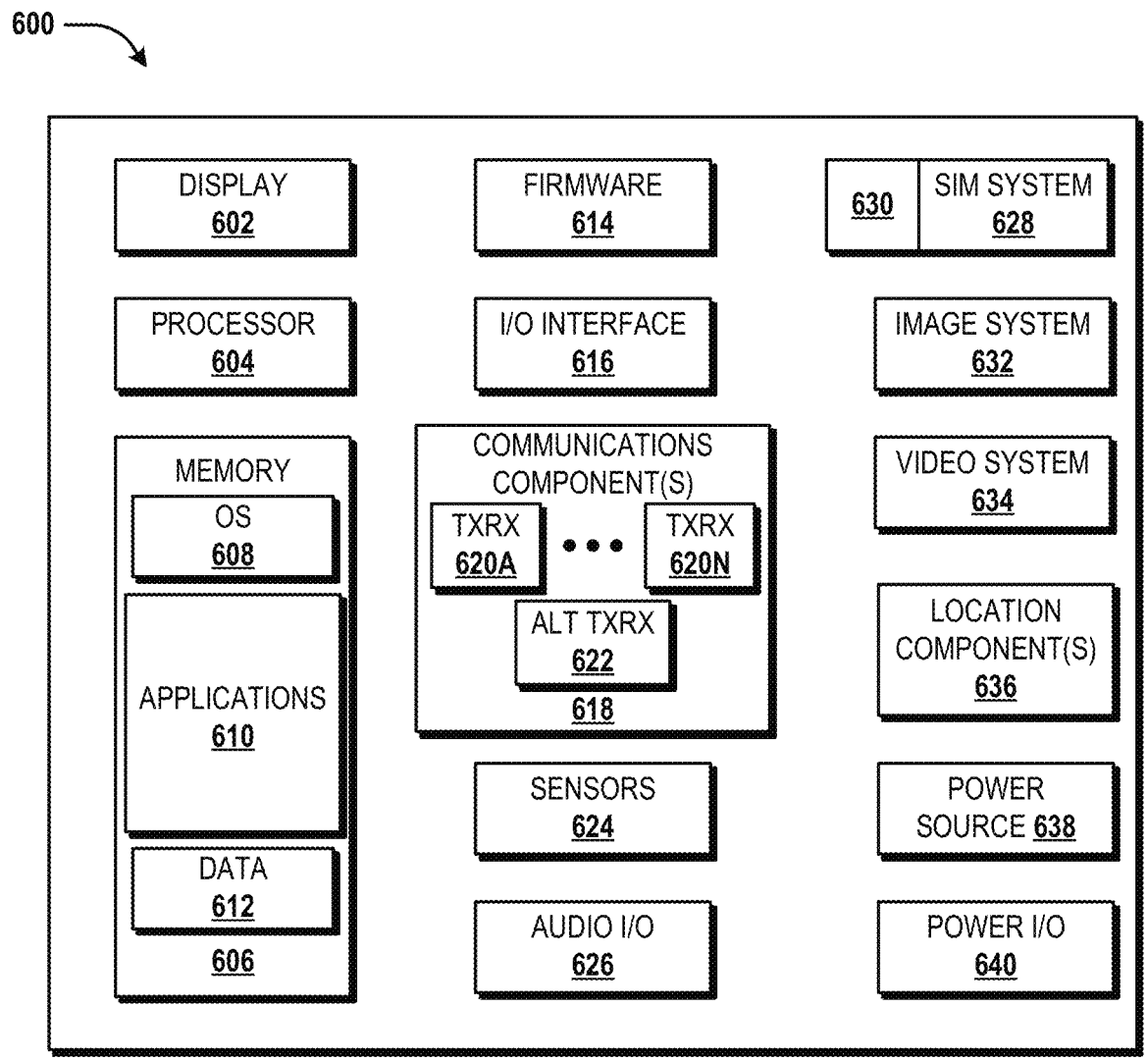
FIG. 6 is a block diagram illustrating an example mobile device capable of implementing aspects of the embodiments disclosed herein.

Turning now to FIG. 6, an illustrative mobile device 600 and components thereof will be described. In some embodiments, the user device 110 can be configured as and/or can have an architecture similar or identical to the mobile device 600 described herein in FIG. 6. It should be understood, however, that the user device 110 may or may not include the functionality described herein with reference to FIG. 6. While connections are not shown between the various components illustrated in FIG. 6, it should be understood that some, none, or all of the components illustrated in FIG. 6 can be configured to interact with one other to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various graphical user interface ("GUI") elements, text, images, video, advertisements, various prompts, virtual keypads and/or keyboards, messaging data, notification messages, metadata, internet content, device status, time, date, calendar data, device preferences, map and location data, combinations thereof, and the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608 (e.g., the operating system 118), one or more applications 610 (e.g., the application(s) 120), other computer-executable instructions stored in a memory 606, or the like. In some embodiments, the applications 610 also can include a UI application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIM- ITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in entering content, viewing account information, answering/initiating calls, entering/deleting data, entering and setting user IDs and passwords for device access, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600. The data 612 can include user preferences, user settings, and/or other data. The applications 610 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, user information, organization information, presence status information, user IDs, passwords, and application initiation (start-up) requests. In some embodiments, the I/O interface 616 can include a hardwire connection such as USB port, a mini-USB port, a micro-USB port, an audio jack, a PS2 port, an IEEE 1344 ("FIREWIRE") port, a serial port, a parallel port, an Ethernet (RJ45) port, an RJ11 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using Global System for Mobile communication ("GSM"), Code Division Multiple Access ("CDMA"), CDMAONE, CDMA2000, Long-Term Evolution ("LTE"), and various other 2G, 2.5G, 3G, 4G, and greater generation technology standards. Moreover, the communications component 618 may facilitate communications over various channel access methods (which may or may not be used by the aforementioned standards) including, but not limited to, Time Division Multiple Access ("TDMA"), Frequency Division Multiple Access ("FDMA"), Wideband CDMA ("W-CDMA"), Orthogonal Frequency-Division multiplexing ("OFDM"), Space-Division Multiple Access ("SDMA"), and the like.

In addition, the communications component 618 may facilitate data communications using Generic Packet Radio Service ("GPRS"), Enhanced Date Rates for GSM Evolution ("EDGE"), the High-Speed Packet Access ("HSPA") protocol family, including High-Speed Downlink Packet Access ("HSDPA"), Enhanced Uplink ("EUL") or otherwise termed Highs-Speed Uplink Packet Access ("HSUPA"), HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-620N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, IRDA, NFC, other RF technologies, combinations thereof, and the like.

In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted-GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Figure 7:
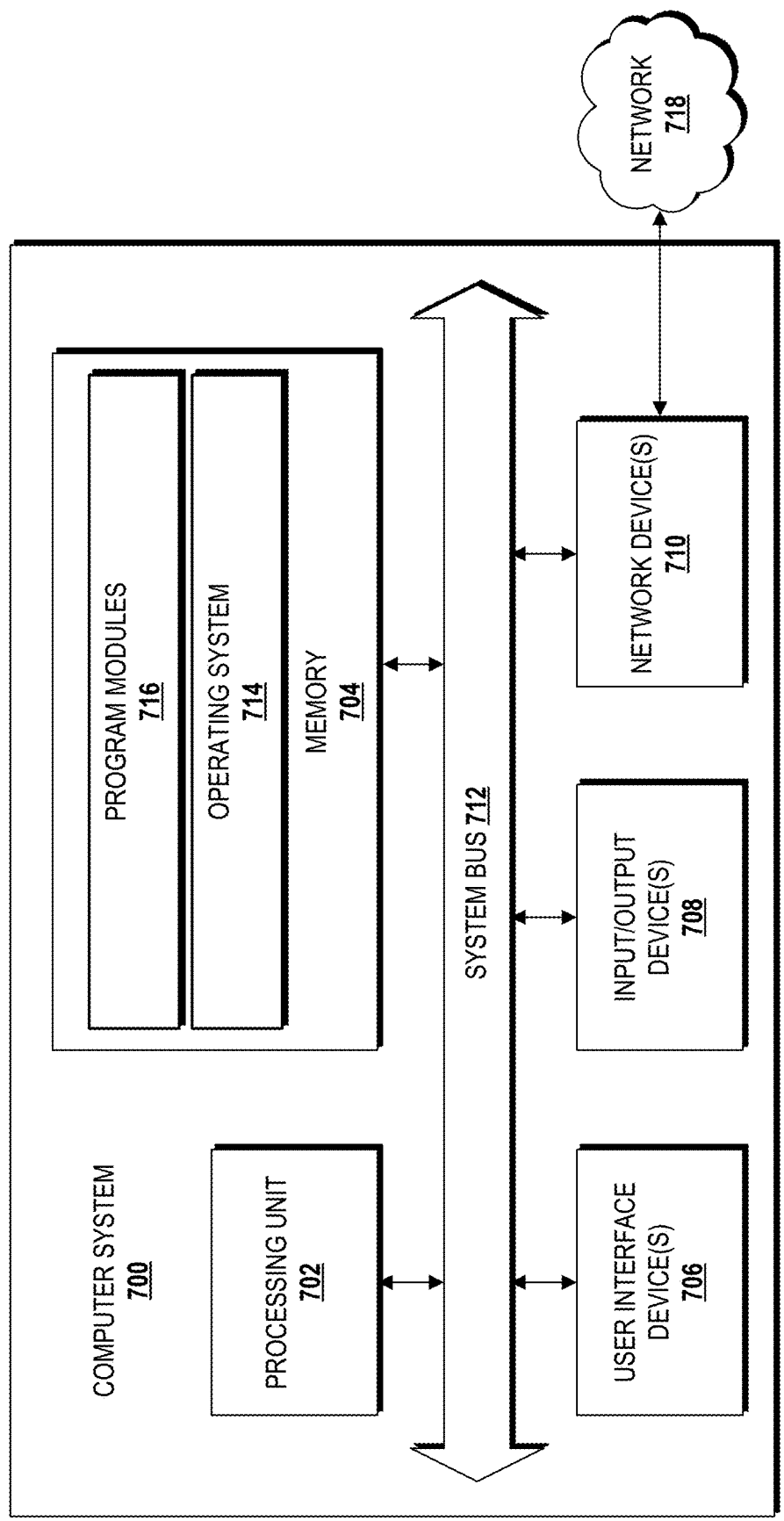
FIG. 7 is a block diagram illustrating an example computer system capable of implementing aspects of the embodiments presented herein.

FIG. 7 is a block diagram illustrating a computer system 700 configured to provide the functionality in accordance with various embodiments of the concepts and technologies disclosed herein. In some implementations, the user device 110 is configured to utilize an architecture that is the same as or similar to the architecture of the computer system 700. It should be understood, however, that modification to the architecture may be made to facilitate certain interactions among elements described herein.

The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 (e.g., the operating system 118) and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 716 may include various software and/or program modules to perform the various operations described herein. The program modules 716 can include, for example, the signal analysis module 124, the device-side transducer communications component 122, and/or the application 120. The program modules 716 and/or other programs can be embodied in computer-readable media containing instructions that, when executed by the processing unit 702, perform one or more of the operations described herein. According to embodiments, the program modules 716 may be embodied in hardware, software, firmware, or any combination thereof. The memory 704 can also store other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network 718. Examples of the network devices 710 include, but are not limited to, a modem, a radio frequency ("RF") or infrared ("IR") transceiver, a telephonic interface, a bridge, a router, or a network card. The network 718 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 718 may be a wired network such as, but not limited to, a Wide Area Network ("WAN"), a wired LAN such as provided via Ethernet, a wired Personal Area Network ("PAN"), or a wired Metropolitan Area Network ("MAN").

Figure 8:
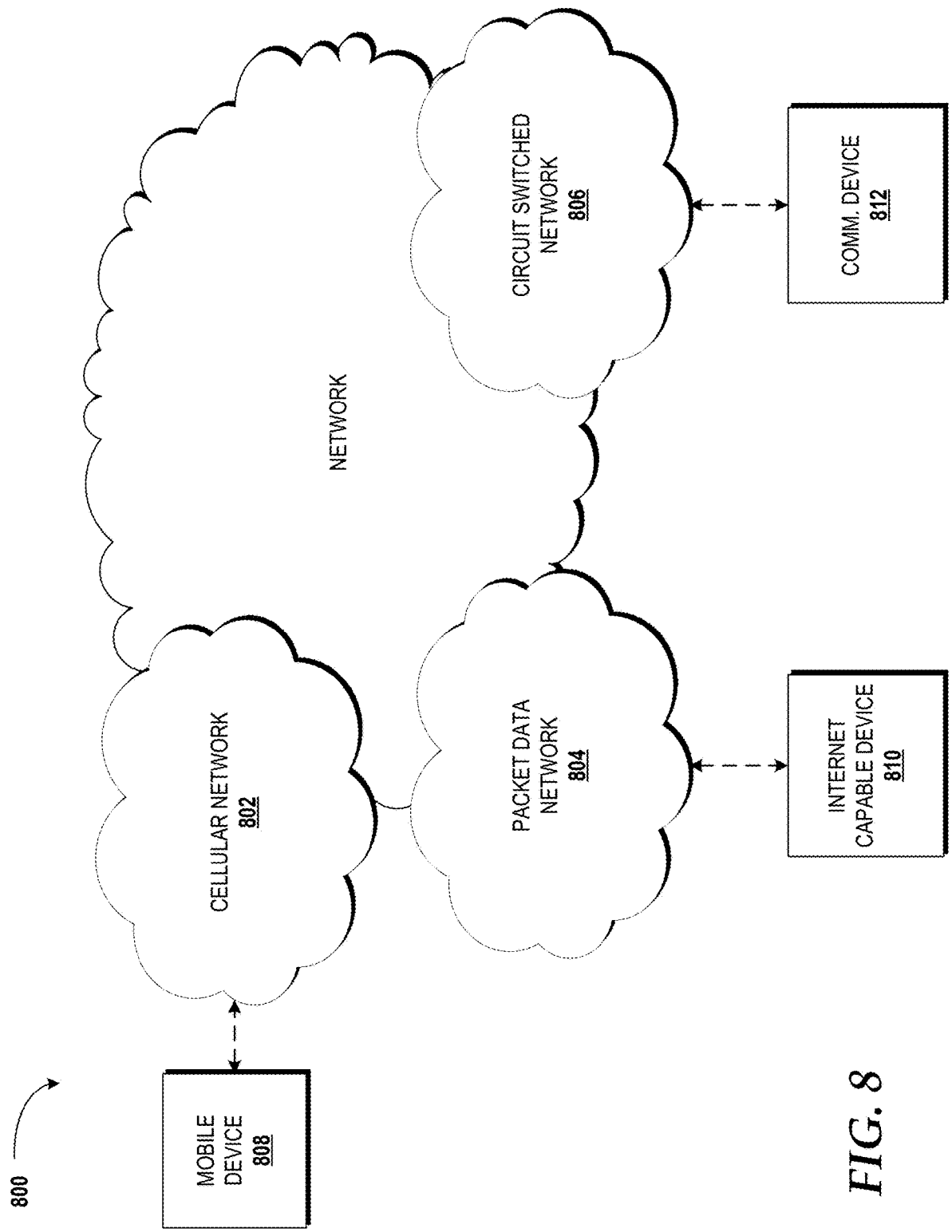
FIG. 8 schematically illustrates a network, according to an illustrative embodiment.

Turning now to FIG. 8, details of a network 800 will be described, according to an illustrative embodiment. The network 800 includes a cellular network 802, a packet data network 804, for example, the Internet, and a circuit switched network 806, for example, a publicly switched telephone network ("PSTN"). The cellular network 802 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, a cellular telephone, a user equipment, a mobile terminal, a PDA, a laptop computer, a handheld computer, the user device 110, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards such as LTE, or the like, as well as evolved and future mobile standards.

The packet data network 804 includes various devices, for example, servers, computers, databases, and other devices in communication with one another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a plain old telephone system ("POTS"). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, the user device 110, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, the user device 110, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810. In the specification, the network 800 is used to refer broadly to any combination of the networks 802, 804, 806. It should be appreciated that substantially all of the functionality described with reference to the network 502 can be performed by the cellular network 802, the packet data network 804, and/or the circuit switched network 806, alone or in combination with other networks, network elements, and the like.

Based on the foregoing, it should be appreciated that concepts and technologies directed to a surface interface have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The concepts and technologies disclosed herein can be enhanced, expanded, and/or diversified, at least in part, by the concepts and technologies disclosed in U.S. patent application Ser. No. 14/083,094 filed Nov. 18, 2013 and assigned to the Assignee of this application, which is hereby incorporated by reference in its entirety. For example, the concept of determining a pressure applied to a surface taught in the aforementioned patent application can be used to enable further functionality for the surface interface disclosed herein. In particular, the surface interface, in addition to detecting one or more contact points, the surface interface can detect a pressure applied at one or more contact points. In cases where the contact points are registered as writing input, the addition of pressure data can be used to modify the thickness of the writing (e.g., higher pressure corresponds to thicker line).

We claim:

1. A system comprising:
a plurality of surface transducers in contact with a surface that is to be used as an input interface for a user device associated with a user;
a user transducer in contact with the user;
wherein the user device comprises
a device-side transducer communications component,
a processor, and
memory that stores instructions that, when executed by the processor, cause the processor to perform operations comprising
receiving, by the device-side transducer communications component, from a surface transducer of the plurality of surface transducers in contact with the surface, a portion of a bone conduction signal,
analyzing the portion of the bone conduction signal to determine a relative location of a part of a body of the user in contact with the surface, and
performing a function responsive to the relative location of the part of the body of the user on the surface.

2. The system of claim 1, wherein the bone conduction signal comprises a user-originated bone conduction signal that is sent by the user transducer through the body of the user towards the surface.

3. The system of claim 2, wherein the operations further comprises:
receiving, by the device-side transducer communications component, from a further surface transducer of the plurality of surface transducers, a further portion of the bone conduction signal; and
analyzing the further portion of the bone conduction signal to determine the relative location of the part of the body of the user on the surface.

4. The system of claim 1, wherein the bone conduction signal comprises a surface-originated bone conduction signal that is sent by the surface transducer of the plurality of surface transducers towards the body of the user.

5. The system of claim 1, wherein receiving, by the device-side transducer communications component, from the surface transducer of the plurality of surface transducers in contact with the surface, the portion of the bone conduction signal comprises receiving, by the device-side transducer communications component, from the surface transducer of the plurality of surface transducers in contact with the surface, the portion of the bone conduction signal via the user transducer.

6. A method comprising:
sending, by a user transducer, a bone conduction signal towards a surface that is to be used as an input interface for a user device associated with a user, wherein a plurality of surface transducers are in contact with the surface;
communicating, to the user device, by each surface transducer of the plurality of surface transducers, a respective portion of the bone conduction signal;
receiving, by a device-side transducer communications component of the user device, from each surface transducer of the plurality of surface transducers in contact with the surface, the respective portion of the bone conduction signal;
analyzing, by a processor of the user device, the respective portion of the bone conduction signal from each surface transducer of the plurality of surface transducers to determine a relative location of contact with the surface; and
performing, by the processor of the user device, a function responsive to the relative location of contact with the surface.

7. The method of claim 6, wherein the user transducer is in contact with the user; and wherein the bone conduction signal traverses at least a part of a body of the user.

8. The method of claim 7, wherein the bone conduction signal further traverses a stylus that is in contact with the surface; and wherein the relative location of contact with the surface comprises the relative location of contact by the stylus with the surface.

9. The method of claim 6, wherein the user transducer is in contact with a stylus; and wherein the bone conduction signal traverses the stylus.

10. The method of claim 9, wherein the relative location of contact with the surface comprises the relative location of contact, by the stylus, with the surface.

11. The method of claim 6, wherein the relative location of contact with the surface comprises the relative location of contact, by the user, with the surface.

12. The method of claim 6, wherein the relative location of contact, by the user, with the surface comprises contact, by the user, at two distinct contact points with the surface.

13. The method of claim 12, wherein a first contact point of the two distinct contact points comprises a first part of a body of the user in contact with the surface; and wherein a second contact point of the two distinct contact points comprises a second part of the body of the user in contact with the surface.

14. The method of claim 12, wherein sending, by the user transducer, the bone conduction signal towards the surface that is to be used as the input interface for the user device associated with the user comprises sending, by the user transducer, the bone conduction signal towards the surface that is to be used as the input interface for the user device associated with the user through a first part of a body of the user; and further comprising sending, by a second user transducer, a second bone conduction signal towards the surface that is to be used as the input interface for the user device associated with the user through a second part of the body of the user.

15. A method comprising
sending, by each surface transducer of a plurality of surface transducers in contact with a surface that is to be used as an input interface for a user device associated with a user, a bone conduction signal through the surface and a body of a user towards a user transducer in contact with the user;
communicating, by the user transducer, a plurality of portions of the bone conduction signal to the user device associated with the user, wherein each portion of the plurality of portions corresponds to a surface transducer of the plurality of surface transducers;
receiving, by a device-side transducer communications component of the user device, the plurality of portions of the bone conduction signal;
analyzing, by a processor of the user device, the plurality of portions of the bone conduction signal to determine a relative location of a part of the body of the user in contact with the surface; and
performing, by the processor of the user device, a function responsive to the relative location of the part of the body of the user in contact with the surface.

16. The method of claim 15, wherein the user transducer is in contact with the user through a stylus.

17. The method of claim 15, wherein the plurality of surface transducers are arranged in a centralized surface transducer configuration of a single transducer device.

18. The method of claim 15, wherein the plurality of surface transducers are arranged in a distributed surface transducer configuration.

19. The method of claim 15, further comprising analyzing, by the processor of the user device, the plurality of portions of the bone conduction signal to determine a direction of movement of the part of the body of the user on the surface; and wherein the relative location and the direction of movement constitute an input gesture.

* * * * *